(12) United States Patent
Takayama et al.

(10) Patent No.: US 9,659,582 B2
(45) Date of Patent: May 23, 2017

(54) METHOD OF MANUFACTURING AN ELECTRONIC DEVICE

(71) Applicants: TDK CORPORATION, Tokyo (JP); SAE MAGNETICS (H.K.) LTD., Hong Kong (CN)

(72) Inventors: Seiichi Takayama, Tokyo (JP); Yasuhiro Ito, Tokyo (JP); Nobuyuki Mori, Tokyo (JP); Koji Shimazawa, Tokyo (JP); Kazuaki Takanuki, Tokyo (JP); Youichi Ando, Tokyo (JP)

(73) Assignees: TDK CORPORATION, Tokyo (JP); SAE MAGNETICS (H.K.) LTD., Hong Kong (CN)

( * ) Notice: Subject to any disclaimer, the term of this patent is extended or adjusted under 35 U.S.C. 154(b) by 1156 days.

(21) Appl. No.: 13/750,499

(22) Filed: Jan. 25, 2013

(65) Prior Publication Data
US 2014/0209664 A1 Jul. 31, 2014

(51) Int. Cl.
G11B 5/00 (2006.01)
G11B 5/31 (2006.01)
G11B 5/455 (2006.01)
G11B 5/105 (2006.01)
G11B 5/60 (2006.01)

(52) U.S. Cl.
CPC ............ *G11B 5/105* (2013.01); *G11B 5/3166* (2013.01); *G11B 5/455* (2013.01); *G11B 5/6088* (2013.01); *G11B 2005/0021* (2013.01); *Y10T 29/49036* (2015.01)

(58) Field of Classification Search
CPC ...... G11B 5/1278; G11B 5/314; G11B 5/6088; G11B 2005/001; G11B 2005/0021; G11B 5/105; G11B 5/465; G11B 5/3166; Y10T 29/49036
See application file for complete search history.

(56) References Cited

U.S. PATENT DOCUMENTS

| | | | |
|---|---|---|---|
| 2008/0316872 A1* | 12/2008 | Shimizu ................ | G11B 5/314 369/13.24 |
| 2010/0085846 A1* | 4/2010 | Shimazawa ............ | G11B 5/102 369/13.14 |
| 2011/0157738 A1* | 6/2011 | Shimazawa ............ | G11B 5/314 360/59 |
| 2011/0228650 A1 | 9/2011 | Shimazawa et al. | |

* cited by examiner

*Primary Examiner* — Livius R Cazan
(74) *Attorney, Agent, or Firm* — Oliff PLC

(57) ABSTRACT

A method of manufacturing an electronic device includes a positioning step of positioning a first member supporting a laser diode with respect to a second member having a waveguide, a bonding step of bonding the first member and the second member together, and a checking step of checking the accuracy of positioning of the first member with respect to the second member. In the positioning step, the laser diode is energized to allow laser light to be emitted, and the laser light is allowed to be incident on the incidence end of the waveguide. In the bonding step, a bonding material is melted by irradiating the first member with heating light while the laser diode is not energized. In the checking step, the laser diode is energized again.

6 Claims, 21 Drawing Sheets

METHOD OF MANUFACTURING AN ELECTRONIC DEVICE

BACKGROUND OF THE INVENTION

1. Field of the Invention

The present invention relates to a method of manufacturing an electronic device including a laser diode, a first member supporting the laser diode, and a second member having a waveguide, the first member being positioned with respect to the second member so that light emitted from the laser diode will be incident on the incidence end of the waveguide.

2. Description of the Related Art

With recent improvements in recording density of magnetic recording devices such as magnetic disk drives, there has been a demand for improving the performance of magnetic heads and magnetic recording media. In a magnetic disk drive, a magnetic head is mounted on a slider that flies slightly above the surface of a magnetic recording medium.

To increase the recording density of a magnetic recording device, it is effective to make the magnetic fine particles of the magnetic recording medium smaller. Making the magnetic fine particles smaller, however, causes the problem that the magnetic fine particles drop in the thermal stability of magnetization. To solve this problem, it is effective to increase the anisotropic energy of the magnetic fine particles. However, increasing the anisotropic energy of the magnetic fine particles leads to an increase in coercivity of the magnetic recording medium, and this makes it difficult to perform data writing with existing magnetic heads.

To solve the aforementioned problems, there has been proposed a technology so-called thermally-assisted magnetic recording. The technology uses a magnetic recording medium having high coercivity. When writing data, a write magnetic field and heat are applied almost simultaneously to the area of the magnetic recording medium where to write data, so that the area rises in temperature and drops in coercivity for data writing. The area where data is written subsequently falls in temperature and rises in coercivity to increase the thermal stability of magnetization. Hereinafter, a magnetic head for use in thermally-assisted magnetic recording will be referred to as a thermally-assisted magnetic recording head.

In thermally-assisted magnetic recording, near-field light is typically used as a means for applying heat to the magnetic recording medium. A known method for generating near-field light is to use a plasmon generator, which is a piece of metal that generates near-field light from plasmons excited by irradiation with light. The light for use to generate near-field light is typically guided through a waveguide, which is provided in the slider, to the plasmon generator disposed near the medium facing surface, that is, a surface of the slider that faces the magnetic recording medium.

To supply the light for use to generate near-field light to the waveguide, a laser diode may be secured to the slider to allow laser light emitted from the laser diode to be incident on the incidence end of the waveguide provided in the slider, as disclosed in U.S. Patent Application Publication No. 2011/0228650 A1, for example.

U.S. Patent Application Publication No. 2011/0228650 A1 discloses a thermally-assisted magnetic recording head including a slider having a waveguide, and a light source unit. The light source unit includes a laser diode and a unit substrate for supporting the laser diode. The unit substrate is bonded to the slider, being positioned so that emitted light from the laser diode will be incident on the incidence end of the waveguide. Solder, for example, is used to bond the unit substrate to the slider.

In the process of manufacturing the thermally-assisted magnetic recording head including the laser diode, the unit substrate and the slider as described above, it is important that the unit substrate be accurately positioned with respect to the slider and secured thereto so that emitted light from the laser diode will be accurately incident on the incidence end of the waveguide.

U.S. Patent Application Publication No. 2011/0228650 A1 discloses a positioning and securing method that allows the unit substrate to be positioned with respect to the slider and secured thereto in the following manner. In the positioning and securing method, emitted light from the laser diode is allowed to be incident on the incidence end of the waveguide, the intensity of light emitted from the emitting end of the waveguide is detected, and the unit substrate is positioned with respect to the slider so that the aforementioned intensity becomes maximum. Subsequently, the unit substrate is irradiated with heating laser light that is projected to pass through the unit substrate, so that the solder interposed between the slider and the unit substrate is heated and melted by the heating laser light. After that, the irradiation with the heating laser light is stopped to solidify the solder to thereby allow the unit substrate to be secured to the slider.

Now, problems with the positioning and securing method above will be described. In the method above, there may occur misalignment of the unit substrate with respect to the slider in the process of melting and then solidifying the solder to thereby secure the unit substrate to the slider. The method above thus has the problem that it is impossible to find the misalignment of the unit substrate with respect to the slider, and consequently there is a possibility of occurrence of defective products.

Further, the inventors of this application have found by experiment that irradiating the unit substrate with heating laser light while the laser diode is emitting laser light may later cause irreversible degradation in the optical output of the laser diode or a failure of the laser diode. Thus, the above-described method may lead to deterioration or failure of the laser diode and consequently result in the occurrence of defective products.

The foregoing problems apply not only to the case of manufacturing a thermally-assisted magnetic recording head but generally to the case of manufacturing an electronic device including a laser diode, a first member supporting the laser diode and a second member having a waveguide, where the first member is positioned with respect to and secured to the second member by the above-described positioning and securing method so that light emitted from the laser diode will be incident on the incidence end of the waveguide.

OBJECTS AND SUMMARY OF THE INVENTION

It is a first object of the present invention to provide a method of manufacturing an electronic device including a laser diode, a first member supporting the laser diode, and a second member having a waveguide, the first member being positioned with respect to the second member so that light emitted from the laser diode will be incident on the incidence end of the waveguide, the method allowing the electronic device to be manufactured without causing deterioration or failure of the laser diode.

It is a second object of the present invention to provide an apparatus for manufacturing an electronic device suitable for the manufacturing method mentioned above.

An electronic device manufactured by a manufacturing method and a manufacturing apparatus of the present invention includes a laser diode that emits laser light when energized, a first member supporting the laser diode, a second member to which the first member is bonded, and a bonding layer bonding the first member and the second member together. The second member has a waveguide allowing the laser light to propagate through. The bonding layer includes a bonding material layer made of a bonding material that melts when heated to a predetermined melting temperature or higher. The waveguide has an incidence end on which the laser light emitted from the laser diode is to be incident.

The manufacturing method of the present invention includes: a positioning step of positioning the first member with respect to the second member with a preliminary bonding layer interposed between the first member and the second member before being bonded together so that the laser light emitted from the laser diode will be incident on the incidence end of the waveguide, the preliminary bonding layer including the bonding material and being configured to later become the bonding layer; a bonding step of bonding the first member and the second member together after the positioning step; and a checking step of checking the accuracy of positioning of the first member with respect to the second member after the bonding step.

In the positioning step, the laser diode is energized to allow the laser diode to emit laser light, the laser light is allowed to be incident on the incidence end of the waveguide, a parameter value corresponding to the intensity of light having been incident on the incidence end and propagated through the waveguide is detected, and the position of the first member with respect to the second member is determined based on the value detected.

In the bonding step, the first member is irradiated with heating light without energizing the laser diode, the bonding material included in the preliminary bonding layer is thereby heated and melted with the heating light, and thereafter the irradiation of the first member with the heating light is stopped to allow the bonding material to solidify so that the preliminary bonding layer becomes the bonding layer.

In the checking step, the laser diode is energized again to allow the laser diode to emit laser light, the laser light is allowed to be incident on the incidence end of the waveguide, a parameter value corresponding to the intensity of light having been incident on the incidence end and propagated through the waveguide is detected, and the accuracy of positioning of the first member with respect to the second member is checked based on the value detected.

The manufacturing method of the present invention may further include a first cooling step of allowing the laser diode to decrease in temperature by not energizing the laser diode for a first period of time, the first cooling step being performed between the positioning step and the bonding step, and a second cooling step of allowing the laser diode to decrease in temperature by not energizing the laser diode for a second period of time, the second cooling step being performed between the bonding step and the checking step.

In the manufacturing method of the present invention, the waveguide may further have an emitting end from which light having been incident on the incidence end and propagated through the waveguide is emitted. In this case, in the positioning step and the checking step, the intensity of the light emitted from the emitting end may be detected as the parameter value.

In the manufacturing method of the present invention, the second member may be a slider for thermally-assisted magnetic recording. The slider may have a medium facing surface facing a magnetic recording medium, a magnetic pole, the waveguide, and a plasmon generator. The magnetic pole has an end face located in the medium facing surface and produces a write magnetic field for writing data on the magnetic recording medium. The plasmon generator is configured to excite a surface plasmon based on light having been incident on the incidence end and propagated through the waveguide and to generate near-field light from the medium facing surface based on the surface plasmon.

Where the second member is a slider, the waveguide may further have an emitting end from which light having been incident on the incidence end and propagated through the waveguide is emitted, and, in the positioning step and the checking step, the intensity of the light emitted from the emitting end may be detected as the parameter value. Alternatively, in the positioning step and the checking step, the intensity of the near-field light generated by the plasmon generator may be detected as the parameter value.

The manufacturing apparatus of the present invention includes an energizing device, a position adjuster, an irradiation device, a detector, and a controller. The energizing device energizes the laser diode to allow the laser diode to emit laser light. The position adjuster adjusts the position of the first member with respect to the second member with a preliminary bonding layer interposed between the first member and the second member before being bonded together. The preliminary bonding layer includes the bonding material and is configured to later become the bonding layer. The irradiation device irradiates the first member with heating light to heat and melt the bonding material included in the preliminary bonding layer. The detector detects a parameter value corresponding to the intensity of light having been incident on the incidence end and propagated through the waveguide. The controller receives the value detected by the detector and controls the energizing device, the position adjuster, and the irradiation device. The controller controls the energizing device and the irradiation device so that the first member is not irradiated with the heating light when the laser diode is energized, whereas the laser diode is not energized when the first member is irradiated with the heating light.

In the manufacturing apparatus of the present invention, the controller may perform a positioning operation and a bonding operation. In the positioning operation, the energizing device and the position adjuster are controlled to energize the laser diode with the preliminary bonding layer interposed between the first member and the second member before being bonded together, and to determine the position of the first member with respect to the second member based on the value detected by the detector, whereby the first member is positioned with respect to the second member so that the laser light emitted from the laser diode will be incident on the incidence end of the waveguide. In the positioning operation, subsequently, the energizing device is controlled to de-energize the laser diode. In the bonding operation, the irradiation device is controlled to irradiate the first member with the heating light after the positioning operation to thereby heat and melt the bonding material included in the preliminary bonding layer with the heating light, and then the irradiation of the first member with the heating light is stopped to allow the bonding material to solidify so that the preliminary bonding layer becomes the bonding layer, whereby the first member and the second member are bonded together.

The controller may further perform a checking operation in which the energizing device is controlled to energize the laser diode again after the bonding operation and the accuracy of positioning of the first member with respect to the second member is checked based on the value detected by the detector. Further, the controller may set a first interval between the positioning operation and the bonding operation during which the laser diode is not energized for a first period of time, and a second interval between the bonding operation and the checking operation during which the laser diode is not energized for a second period of time.

In the manufacturing apparatus of the present invention, the waveguide may further have an emitting end from which light having been incident on the incidence end and propagated through the waveguide is emitted. In this case, the detector may detect the intensity of the light emitted from the emitting end as the parameter value.

In the manufacturing apparatus of the present invention, the second member may be a slider for thermally-assisted magnetic recording. The slider may have a medium facing surface facing a magnetic recording medium, a magnetic pole, the waveguide, and a plasmon generator. The magnetic pole has an end face located in the medium facing surface and produces a write magnetic field for writing data on the magnetic recording medium. The plasmon generator is configured to excite a surface plasmon based on light having been incident on the incidence end and propagated through the waveguide and to generate near-field light from the medium facing surface based on the surface plasmon.

Where the second member is a slider, the waveguide may further have an emitting end from which light having been incident on the incidence end and propagated through the waveguide is emitted, and the detector may detect the intensity of the light emitted from the emitting end as the parameter value. Alternatively, the detector may detect the intensity of the near-field light generated by the plasmon generator as the parameter value.

According to the manufacturing method and the manufacturing apparatus of the present invention, the first member is not irradiated with the heating light when the laser diode is energized, whereas the laser diode is not energized when the first member is irradiated with the heating light. It is thereby possible to prevent the laser diode from suffering deterioration or failure. The present invention thus makes it possible to manufacture an electronic device in which the first member is positioned with respect to the second member so that light emitted from the laser diode will be incident on the incidence end of the waveguide, without causing deterioration or failure of the laser diode.

Further, according to the manufacturing method of the present invention, the provision of the checking step makes it possible to identify electronic devices that are high in accuracy of positioning of the first member with respect to the second member, and to supply such electronic devices as products.

Other and further objects, features and advantages of the present invention will appear more fully from the following description.

DETAILED DESCRIPTION OF THE PREFERRED EMBODIMENTS

First Embodiment

Figure 1:
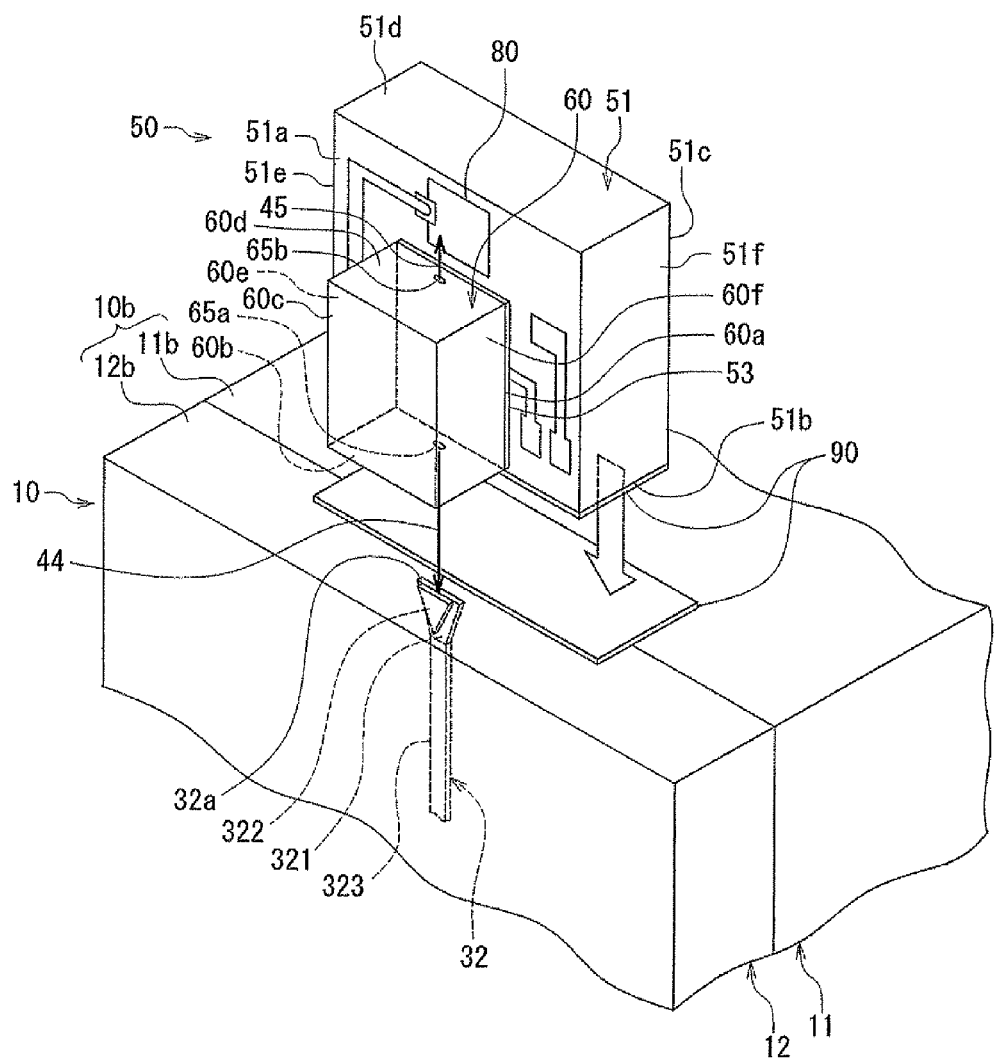
FIG. 1 is a perspective view showing the main part of an electronic device according to a first embodiment of the invention.
Figure 2:
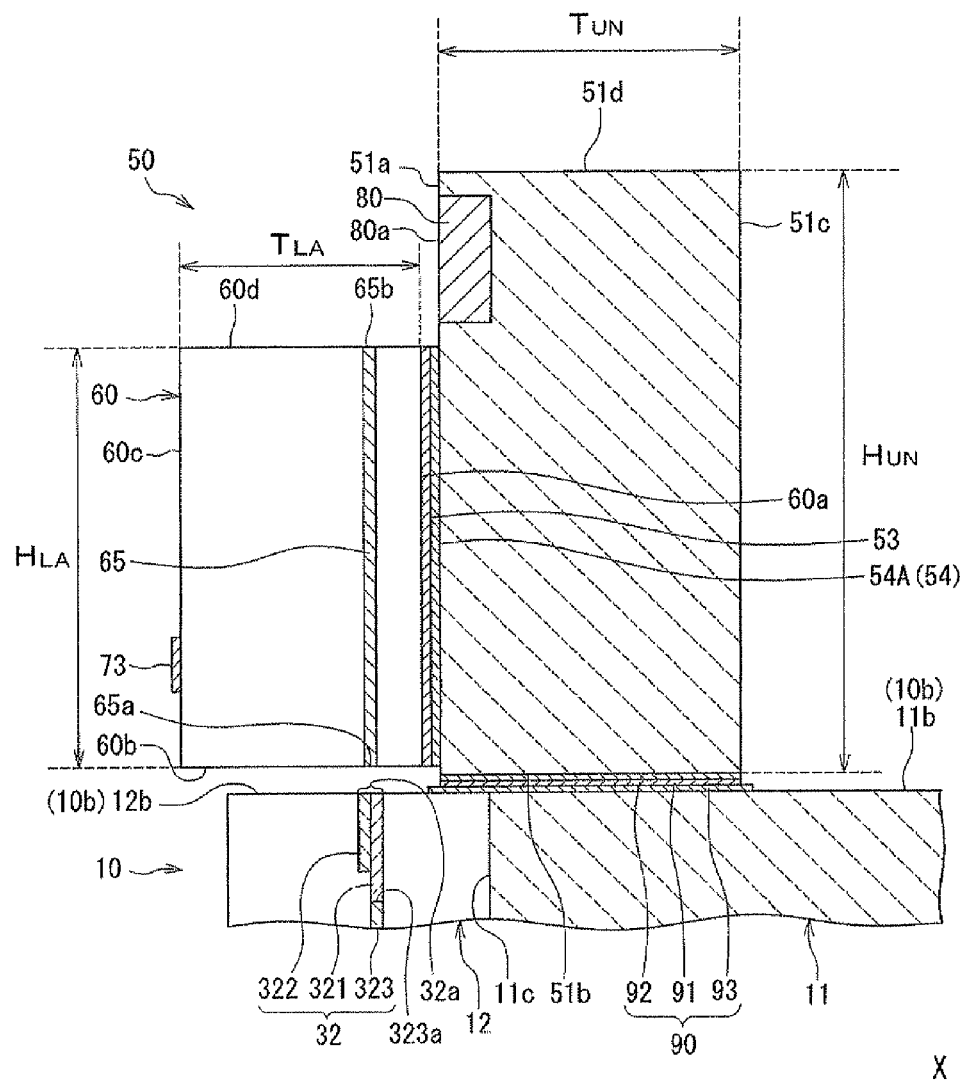
FIG. 2 is a cross-sectional view showing the main part of the electronic device according to the first embodiment of the invention.
Figure 3:
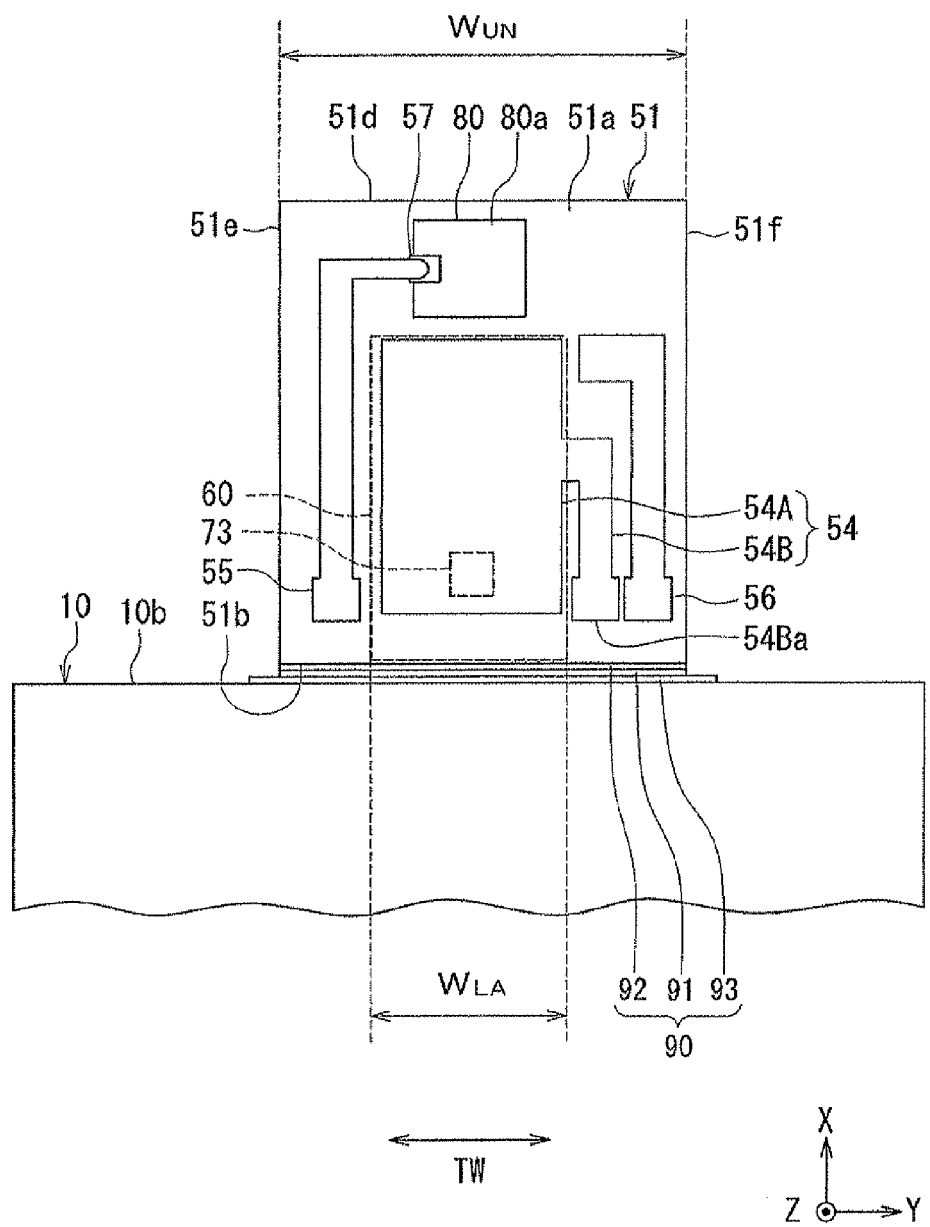
FIG. 3 is a plan view showing the top surface of a first member of the electronic device according to the first embodiment of the invention.

Preferred embodiments of the present invention will now be described in detail with reference to the drawings. First, with reference to FIG. 1 to FIG. 3, an electronic device according to a first embodiment of the invention will be described in outline. FIG. 1 is a perspective view showing the main part of the electronic device. FIG. 2 is a cross-sectional view showing the main part of the electronic device. FIG. 3 is a plan view showing the top surface of a first member of the electronic device. As shown in FIG. 1 to FIG. 3, the electronic device includes a laser diode 60, a first member 51 supporting the laser diode 60, a second member 10 to which the first member 51 is bonded, and a bonding layer 90 bonding the first member 51 and the second member 10 together. FIG. 1 shows a state in which the first member 51 and the second member 10 are separated from each other. The laser diode 60 emits laser light when energized. The second member 10 has a waveguide 32 allowing the laser light to propagate through. The waveguide 32 has an incidence end 32a on which the laser light is to be incident.

In the present embodiment, as shown in FIG. 1, the laser diode 60 and the first member 51 are each generally rectangular-solid-shaped. The first member 51 has an outer surface, the outer surface including a top surface 51a, a front end face 51b, a bottom surface 51c opposite to the top surface 51a, a rear end face 51d opposite to the front end face 51b, and two side surfaces 51e and 51f opposite to each other and connecting the surfaces 51a to 51d to each other.

The laser diode 60 has an outer surface, the outer surface including a bottom surface 60a, a front end face 60b, a top surface 60c opposite to the bottom surface 60a, a rear end face 60d opposite to the front end face 60b, and two side surfaces 60e and 60f opposite to each other and connecting the surfaces 60a to 60d to each other. The laser diode 60 is bonded to the first member 51 with the bottom surface 60a toward the top surface 51a of the first member 51 and with the front end face 60b located near the ridge between the top surface 51a and the front end face 51b of the first member 51. When in the state in which the laser diode 60 is bonded to the first member 51, the bottom surface 60a and the top surface 60c are parallel to the top surface 51a while the front end face 60b and the rear end face 60d are parallel to the front end face 51b.

The second member 10 has an outer surface, the outer surface including a rear surface 10b including the incidence end 32a of the waveguide 32. The first member 51 is bonded to the second member 10 with the front end face 51b toward the rear surface 10b. When in the state in which the first member 51 is bonded to the second member 10, the top surface 51a is perpendicular to the rear surface 10b while the front end face 51b is parallel to the rear surface 10b. Further, when in this state, the front end face 60b of the laser diode 60 faces the rear surface 10b. The bonding layer 90 is interposed between the front end face 51b and the rear surface 10b.

As shown in FIG. 1, the laser diode 60 has a first emission part 65a for emitting forward light 44 and a second emission part 65b for emitting backward light 45. The backward light 45 is emitted toward a direction opposite to the direction of the forward light 44. Both the forward light 44 and the backward light 45 are laser light. The front end face 60b includes the first emission part 65a. The rear end face 60d includes the second emission part 65b. As shown in FIG. 2, the distance between the bottom surface 60a and the first emission part 65a is smaller than the distance between the top surface 60c and the first emission part 65a, while the distance between the bottom surface 60a and the second emission part 65b is smaller than the distance between the top surface 60c and the second emission part 65b.

The forward light 44, which is part of the emitted light from the laser diode 60, enters the waveguide 32 of the second member 10. The first member 51 is bonded to the second member 10, being positioned with respect to the second member 10 so that the emitted light (the forward light 44) from the laser diode 60 will be incident on the incidence end 32a of the waveguide 32.

The electronic device further includes a photodetector 80 integrated with the first member 51. The photodetector 80 has a light receiving surface 80a to receive the backward light 45 emitted from the second emission part 65b. The photodetector 80 is embedded in the first member 51 such that the light receiving surface 80a is in the vicinity of the second emission part 65b of the laser diode 60 when in the state in which the laser diode 60 is bonded to the first member 51.

In the present embodiment, in particular, the electronic device is a thermally-assisted magnetic recording head, and the second member 10 is a slider for thermally-assisted magnetic recording. The laser diode 60 is to generate laser light for thermally-assisted magnetic recording, and is bonded to the first member 51 and thereby unitized therewith for use. In the following descriptions, the second member 10 will be referred to as the slider 10, and the first member 51 as the unit substrate 51. Further, the unit made up of the laser diode 60 and the unit substrate 51 will be referred to as the light source unit and denoted by reference numeral 50.

Figure 4:
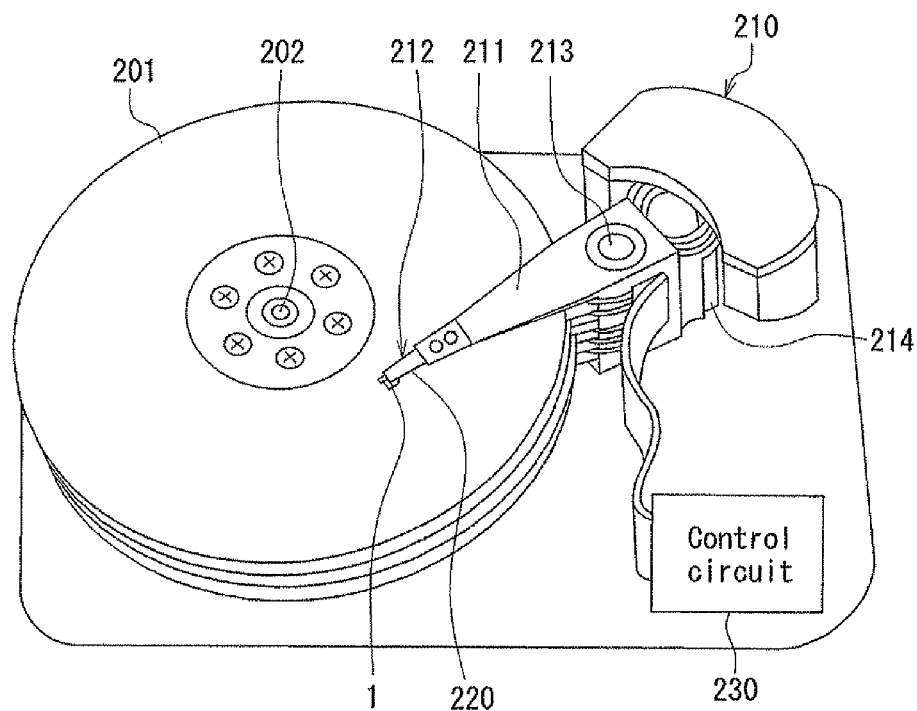
FIG. 4 is a perspective view showing a magnetic recording device of the first embodiment of the invention.

The electronic device according to the present embodiment will now be described in detail with reference to an example of the specific configuration of the thermally-assisted magnetic recording head. First, with reference to FIG. 4, a description will be given of a magnetic disk drive serving as a magnetic recording device that employs the thermally-assisted magnetic recording head of the present embodiment. As shown in FIG. 4, the magnetic disk drive includes a plurality of magnetic disks 201 as a plurality of magnetic recording media, and a spindle motor 202 for rotating the magnetic disks 201. The magnetic disks 201 of the present embodiment are for use in perpendicular magnetic recording. Each magnetic disk 201 has such a structure that a soft magnetic under layer, a middle layer, and a magnetic recording layer (perpendicular magnetization layer) are stacked in this order on a disk substrate.

The magnetic disk drive further includes an assembly carriage device 210 having a plurality of driving arms 211, and a plurality of head gimbal assemblies 212 attached to respective distal ends of the driving arms 211. Each head gimbal assembly 212 includes a thermally-assisted magnetic recording head 1 of the present embodiment, and a suspension 220 that supports the thermally-assisted magnetic recording head 1.

The assembly carriage device 210 is a device for positioning each thermally-assisted magnetic recording head 1 on tracks that are formed in the magnetic recording layer of each magnetic disk 201 and that have recording bits aligned thereon. The assembly carriage device 210 further has a pivot bearing shaft 213 and a voice coil motor 214. The plurality of driving arms 211 are stacked in a direction along the pivot bearing shaft 213 and are pivotable about the shaft 213 by being driven by the voice coil motor 214. The magnetic recording device is not structurally limited to the magnetic disk drive having the above-described configuration. For example, the magnetic recording device may be provided with a single magnetic disk 201, a single driving arm 211, a single head gimbal assembly 212 and a single thermally-assisted magnetic recording head 1.

The magnetic disk drive further includes a control circuit 230 that controls the read and write operations of the thermally-assisted magnetic recording heads 1 and also controls the light emitting operation of the laser diode 60. The control circuit 230 of the present embodiment has a particular function for controlling the intensity of emitted light from the laser diode 60 on the basis of the detection result provided by the photodetector 80. According to the present embodiment, it is thus possible to stabilize the intensity of near-field light used for thermally-assisted magnetic recording, and to thereby allow the thermally-assisted magnetic recording head 1 to perform the write operation with stability.

Figure 5:
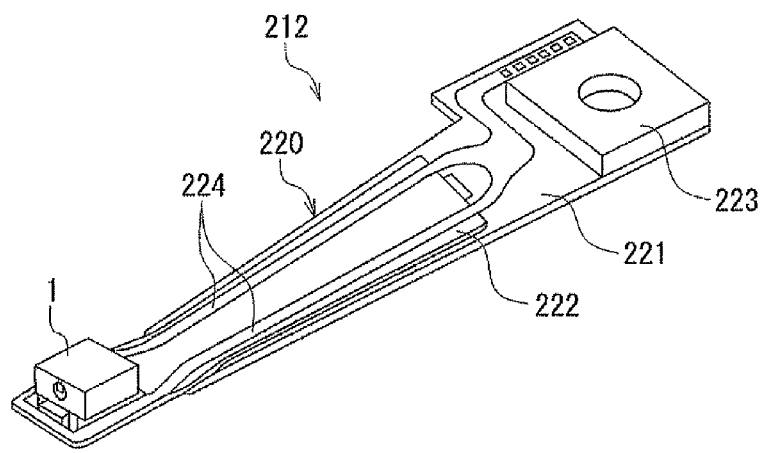
FIG. 5 is a perspective view showing a head gimbal assembly of the first embodiment of the invention.

FIG. 5 is a perspective view showing the head gimbal assembly 212 of FIG. 4. As previously described, the head gimbal assembly 212 includes the thermally-assisted magnetic recording head 1 and the suspension 220. The suspension 220 has a load beam 221, a flexure 222 secured to the load beam 221 and having flexibility, a base plate 223 provided at the base part of the load beam 221, and a wiring member 224 provided on the load beam 221 and the flexure 222. The wiring member 224 includes a plurality of leads. The thermally-assisted magnetic recording head 1 is secured to the flexure 222 at the distal end of the suspension 220 such that the head 1 faces the surface of the magnetic disk 201 with a predetermined spacing (flying height). One end of the wiring member 224 is electrically connected to a plurality of terminals of the thermally-assisted magnetic recording head 1. The other end of the wiring member 224 is provided with a plurality of pad-shaped terminals arranged at the base part of the load beam 221.

The head gimbal assembly is not limited to one having the configuration shown in FIG. 5. For example, the head gimbal assembly may have an IC chip for driving the head that is mounted somewhere along the suspension 220.

Figure 6:
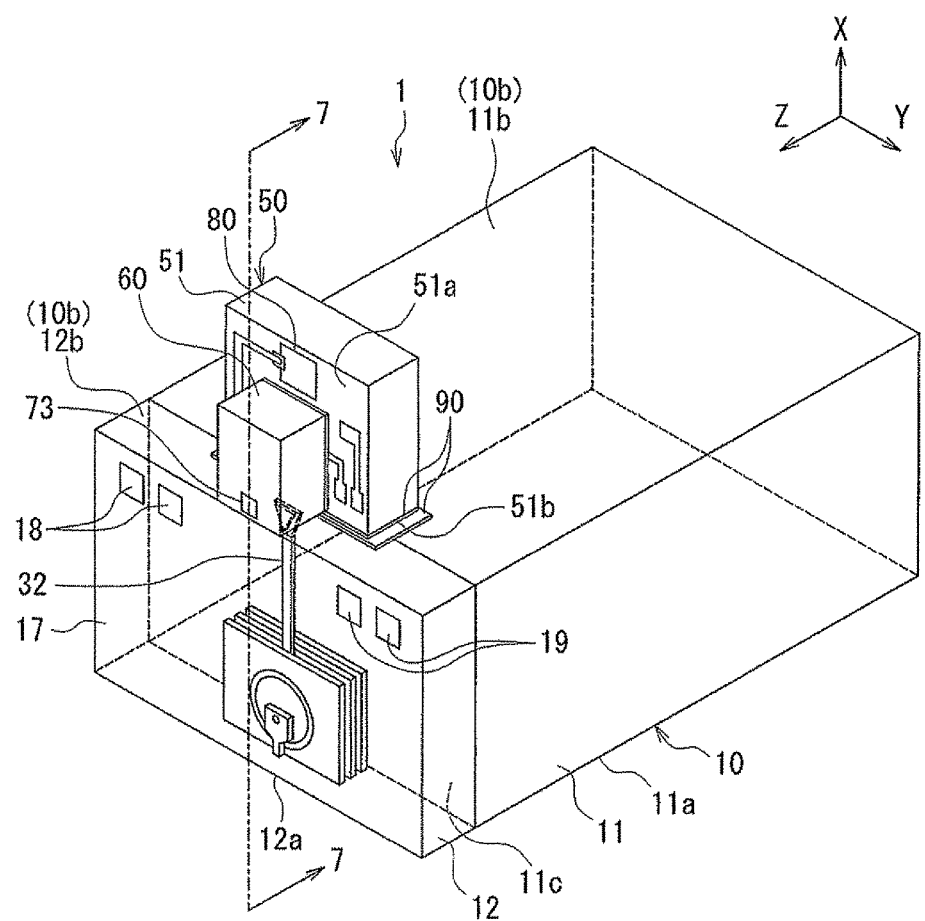
FIG. 6 is a perspective view showing a thermally-assisted magnetic recording head of the first embodiment of the invention.
Figure 7:
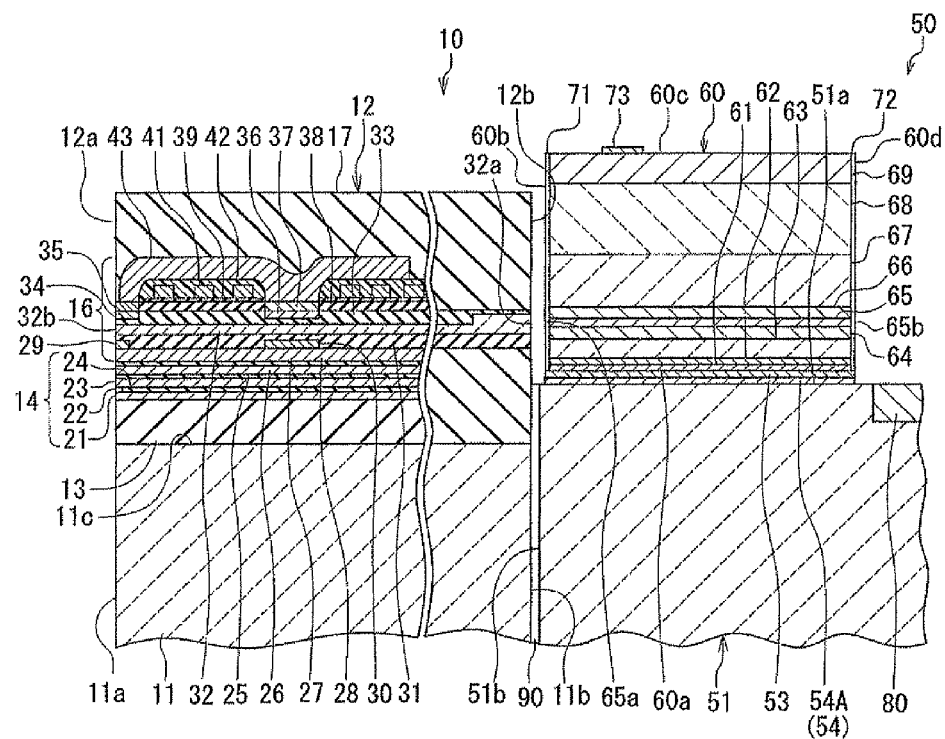
FIG. 7 shows a cross section taken along line 7-7 of FIG. 6.
Figure 8:
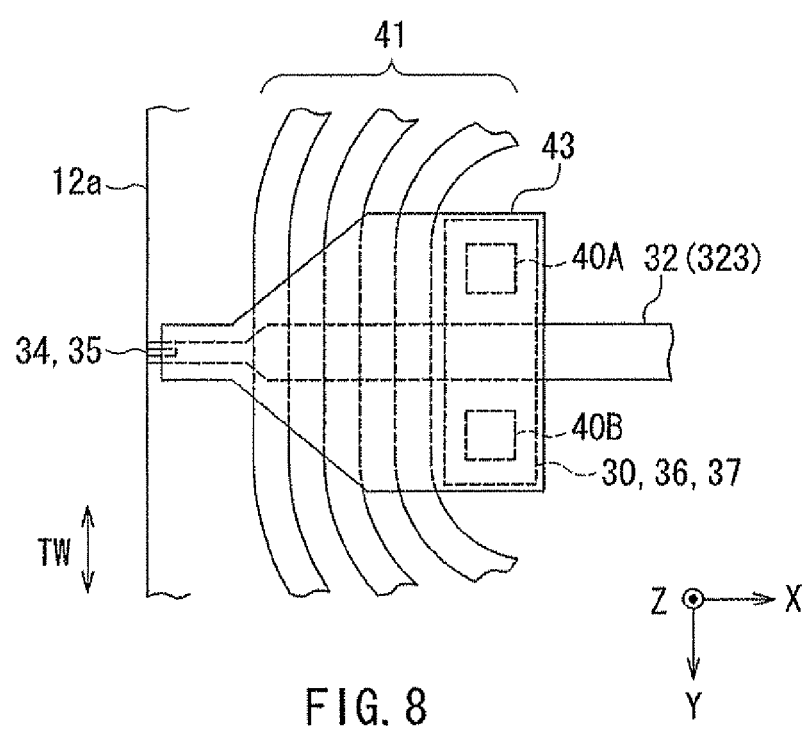
FIG. 8 is a plan view showing a part of a head unit of a slider of the first embodiment of the invention.

The configuration of the thermally-assisted magnetic recording head 1 of the present embodiment will now be described with reference to FIG. 6 to FIG. 8. FIG. 6 is a perspective view showing the thermally-assisted magnetic recording head 1. FIG. 7 shows a cross section taken along line 7-7 of FIG. 6. FIG. 8 is a plan view showing a part of a head unit of the slider 10. The thermally-assisted magnetic recording head 1 includes the slider 10 and the light source unit 50.

The slider 10 includes a slider substrate 11 made of a ceramic material such as aluminum oxide-titanium carbide ($Al_2O_3$—TiC), and a head unit 12. The slider substrate 11 is generally rectangular-solid-shaped. The slider substrate 11 has a medium facing surface 11a facing the magnetic disk 201, a rear surface 11b opposite to the medium facing surface 11a, and four surfaces connecting the medium facing surface 11a to the rear surface 11b. One of the four surfaces connecting the medium facing surface 11a to the rear surface 11b is an element-forming surface 11c. The element-forming surface 11c is perpendicular to the medium facing surface 11a. The head unit 12 is disposed on the element-forming surface 11c. The medium facing surface 11a is processed so as to obtain an appropriate flying height of the slider 10 from the magnetic disk 201. The head unit 12 has a medium facing surface 12a facing the magnetic disk 201, and a rear surface 12b opposite to the medium facing surface 12a. The medium facing surface 12a is parallel to the medium facing surface 11a of the slider substrate 11, while the rear surface 12b is parallel to the rear surface 11b of the slider substrate 11. The rear surface 10b of the slider 10 is composed of the rear surfaces 11b and 12b.

Where the components of the head unit 12 are concerned, with respect to a reference position, a position located in the direction that extends perpendicular to the element-forming surface 11c and away from the element-forming surface 11c is defined as "above", and a position located in the direction opposite to the aforementioned direction is defined as "below". Where the layers included in the head unit 12 are concerned, the surface closer to the element-forming surface 11c is defined as a "bottom surface," and the surface farther from the element-forming surface 11c is defined as a "top surface."

Further, X direction, Y direction, Z direction, -X direction, -Y direction, and -Z direction will be defined as follows. The X direction is the direction perpendicular to the medium facing surface 11a and from the medium facing surface 11a to the rear surface 11b. The Y direction is the direction parallel to the medium facing surface 11a and the element-forming surface 11c and from the back side to the front side of FIG. 7. The Z direction is the direction extending perpendicular to the element-forming surface 11c and away from the element-forming surface 11c. The -X direction, the -Y direction, and the -Z direction are opposite to the X direction, the Y direction, and the Z direction, respectively. As viewed from the slider 10, the magnetic disk 201 travels in the Z direction. The slider 10 has an air inflow end (a leading end) at the end of the medium facing surface 11a in the -Z direction. The slider 10 has an air outflow end (a trailing end) at the end of the medium facing surface 12a in the Z direction. The track width direction TW shown in FIG. 8 is parallel to the Y direction.

The light source unit 50 includes the unit substrate 51, the laser diode 60, and the photodetector 80. When in the state shown in FIG. 6 and FIG. 7, the top surface 51a of the unit substrate 51 is parallel to the element-forming surface 11c. The light source unit 50 and its components will be described, where appropriate, with respect to the X direction, the Y direction, the Z direction, the -X direction, the -Y direction, and the -Z direction defined above. In that case, the state shown in FIG. 6 and FIG. 7 shall be the reference state. Where the components of the light source unit 50 are concerned, a position located in the Z direction relative to a reference position will be defined as "above", and a position located in the opposite direction will be defined as "below".

The unit substrate 51 may have a heat sink function to dissipate heat generated by the laser diode 60, in addition to the function of supporting the laser diode 60. The unit substrate 51 is made of, for example, a semiconductor material such as Si, GaAs or the like.

The light source unit 50 further includes a solder layer 53 bonding the laser diode 60 and the unit substrate 51 together. The solder layer 53 is interposed between the bottom surface 60a of the laser diode 60 and the top surface 51a of the unit substrate 51. The solder layer 53 is made of AuSn solder, for example.

The thermally-assisted magnetic recording head 1 further includes the bonding layer 90 bonding the unit substrate 51 and the slider 10 together. Bonding the unit substrate 51 to the slider 10 allows the light source unit 50 to be secured to the slider 10. The unit substrate 51, the laser diode 60, the photodetector 80, and the bonding layer 90 will be described in more detail later.

As shown in FIG. 7, the head unit 12 includes an insulating layer 13 disposed on the element-forming surface 11c, and further includes a read head section 14, a write head section 16 and a protective layer 17 which are stacked in this order on the insulating layer 13. The insulating layer 13 and the protective layer 17 are each made of an insulating material such as $Al_2O_3$ (hereinafter, also referred to as alumina).

The read head section 14 includes a bottom shield layer 21 disposed on the insulating layer 13, an MR element 22 disposed on the bottom shield layer 21, a top shield layer 23 disposed on the MR element 22, and an insulating layer 24 disposed between the bottom shield layer 21 and the top shield layer 23 and surrounding the MR element 22. The bottom shield layer 21 and the top shield layer 23 are each made of a soft magnetic material. The insulating layer 24 is made of an insulating material such as alumina.

An end of the MR element 22 is located in the medium facing surface 12a. The MR element may be a giant magnetoresistive (GMR) element or a tunneling magnetoresistive (TMR) element, for example. The GMR element may be of either the current-in-plane (CIP) type in which a sense current for use in magnetic signal detection is fed in a direction generally parallel to the planes of layers constituting the GMR element or the current-perpendicular-to-plane (CPP) type in which the sense current is fed in a direction generally perpendicular to the planes of layers constituting the GMR element. Where the MR element 22 is a TMR element or a CPP-type GMR element, the bottom shield layer 21 and the top shield layer 23 may also serve as electrodes for feeding the sense current to the MR element 22. Where the MR element 22 is a CIP-type GMR element, insulating films are respectively provided between the MR element 22 and the bottom shield layer 21 and between the MR element 22 and the top shield layer 23, and two leads are provided between these insulating films in order to feed the sense current to the MR element 22.

The head unit 12 further includes an insulating layer 25 disposed on the top shield layer 23, a middle shield layer 26 disposed on the insulating layer 25, and an insulating layer 27 disposed on the middle shield layer 26. The middle shield layer 26 functions to shield the MR element 22 from a magnetic field produced in the write head section 16. The insulating layers 25 and 27 are each made of an insulating material such as alumina. The middle shield layer 26 is made of a soft magnetic material. The insulating layer 25 and the middle shield layer 26 may be omitted.

The write head section 16 of the present embodiment is for use in perpendicular magnetic recording. The write head section 16 includes a bottom yoke layer 28 disposed on the insulating layer 27, a bottom shield layer 29 disposed on the bottom yoke layer 28 in the vicinity of the medium facing surface 12a, and a coupling layer 30 disposed on the bottom yoke layer 28 at a position away from the medium facing surface 12a. The bottom yoke layer 28, the bottom shield layer 29, and the coupling layer 30 are each made of a soft magnetic material.

The write head section 16 further includes a cladding layer 31 disposed to cover the bottom yoke layer 28, the bottom shield layer 29 and the coupling layer 30, the waveguide 32 disposed on the cladding layer 31, and a cladding layer 33 disposed to cover the cladding layer 31 and the waveguide 32. The waveguide 32 extends in a direction perpendicular to the medium facing surface 12a (the X direction). The waveguide 32 has the incidence end 32a located in the rear surface 12b. The waveguide 32 allows laser light to propagate therethrough, the laser light being the forward light 44 having been emitted from the first emission part 65a of the laser diode 60 and incident on the incidence end 32a. In the present embodiment, the waveguide 32 further has an emitting end 32b located in the medium facing surface 12a. The emitting end 32b allows the laser light having been incident on the incidence end 32a and propagated through the waveguide 32 to be emitted therefrom.

The waveguide 32 is made of a dielectric material that transmits the laser light. Each of the cladding layers 31 and 33 is made of a dielectric material and has a refractive index lower than that of the waveguide 32. For example, where the laser light has a wavelength of 600 nm and the waveguide 32 is made of $Al_2O_3$ (refractive index n=1.63), the cladding layers 31 and 33 may be made of $SiO_2$ (n=1.46). Where the waveguide 32 is made of tantalum oxide such as $Ta_2O_5$ (n=2.16), the cladding layers 31 and 33 may be made of $SiO_2$ or $Al_2O_3$.

The write head section 16 further includes a plasmon generator 34 disposed above the waveguide 32 in the vicinity of the medium facing surface 12a, and a magnetic pole 35 disposed at such a location that the plasmon generator 34 is interposed between the magnetic pole 35 and the waveguide 32. The plasmon generator 34 is made of a conductive material such as metal. For example, the plasmon generator 34 may be made of one of Au, Ag, Al, Pd, Pt, Mg, Cu, In, Rh, Ir, and Ru, or an alloy composed of two or more of these materials. The magnetic pole 35 is made of a soft magnetic material, or a magnetic metal material in particular. The configurations and locations of the waveguide 32, the plasmon generator 34 and the magnetic pole 35 will be described in detail later.

The write head section 16 further includes a coupling layer 36 located away from the medium facing surface 12a and embedded in the cladding layer 33, and a coupling layer 37 lying on the coupling layer 36. The coupling layers 36 and 37 are located above the coupling layer 30. The coupling layers 36 and 37 are each made of a soft magnetic material.

As shown in FIG. 8, the write head section 16 further includes two coupling portions 40A and 40B embedded in the cladding layers 31 and 33. The coupling portions 40A and 40B are each made of a soft magnetic material. The coupling portions 40A and 40B are located on opposite sides of the waveguide 32 in the track width direction TW, each at a distance from the waveguide 32. The bottom surfaces of the coupling portions 40A and 40B are in contact with the top surface of the coupling layer 30. The top surfaces of the coupling portions 40A and 40B are in contact with the bottom surface of the coupling layer 36.

The write head section 16 further includes an insulating layer 38 disposed around the magnetic pole 35 and the coupling layer 37, an insulating layer 39 disposed on the insulating layer 38, a coil 41 disposed on the insulating layer 39, and an insulating layer 42 covering the coil 41. The insulating layers 38 and 39 are each made of an insulating material such as alumina. The coil 41 is planar spiral-shaped and wound around the coupling layer 37. The coil 41 produces a magnetic field corresponding to data to be written on the magnetic disk 201. The coil 41 is made of a conductive material such as copper. The insulating layer 42 is made of photoresist, for example.

The write head section 16 further includes a top yoke layer 43. The top yoke layer 43 lies on the magnetic pole 35, the insulating layer 42 and the coupling layer 37. A portion of the top yoke layer 43 located near the medium facing surface 12a is in contact with the top surface of the magnetic pole 35, and another portion of the top yoke layer 43 away from the medium facing surface 12a is in contact with the top surface of the coupling layer 37. The top yoke layer 43 is made of a soft magnetic material.

In the write head section 16, a magnetic path for passing a magnetic flux corresponding to the magnetic field produced by the coil 41 is formed by the bottom shield layer 29, the bottom yoke layer 28, the coupling layer 30, the coupling portions 40A and 40B, the coupling layers 36 and 37, the top yoke layer 43, and the magnetic pole 35. The magnetic pole 35 has an end face located in the medium facing surface 12a, allows the magnetic flux corresponding to the magnetic field produced by the coil 41 to pass, and produces a write magnetic field for writing data on the magnetic disk 201 by means of a perpendicular magnetic recording system. The bottom shield layer 29 captures a magnetic flux produced from the end face of the magnetic pole 35 and spreading in directions other than the direction perpendicular to the plane of the magnetic disk 201, and thereby prevents the magnetic flux from reaching the magnetic disk 201.

As shown in FIG. 7, the protective layer 17 is disposed to cover the write head section 16. As shown in FIG. 6, the head unit 12 further includes a pair of terminals 18 disposed on the top surface of the protective layer 17 and electrically connected to the MR element 22, and a pair of terminals 19 disposed on the top surface of the protective layer 17 and electrically connected to the coil 41. These terminals 18 and 19 are electrically connected to four of the plurality of pad-shaped terminals of the wiring member 224 shown in FIG. 5.

The waveguide 32 will now be described in more detail with reference to FIG. 1 and FIG. 2. The waveguide 32 has a first propagation part 321 extending in the −X direction from the rear surface 12b to a predetermined position not reaching the medium facing surface 12a, a second propagation part 322 stacked on the first propagation part 321, and a third propagation part 323 extending in the −X direction from the aforementioned predetermined position to be continuous with the first propagation part 321.

The first propagation part 321 has an incidence end face located in the rear surface 12b, an emitting end face opposite to the incidence end face, a top surface, a bottom surface, and two side surfaces. The incidence end face and the emitting end face of the first propagation part 321 are rectangular in shape, for example. The incidence end face of the first propagation part 321 forms a part of the incidence end 32a of the waveguide 32. The width of the first propagation part 321 in the Y direction decreases toward the emitting end face. Each of the top and bottom surfaces of the first propagation part 321 is in the shape of a trapezoid such that the side closer to the medium facing surface 12a is shorter than the side located in the rear surface 12b.

The second propagation part 322 is located on the top surface of the first propagation part 321. The second propagation part 322 has an incidence end face located in the rear surface 12b, an edge part opposite to the incidence end face, a top surface, a bottom surface in contact with the top surface of the first propagation part 321, and two side surfaces. The incidence end face of the second propagation part 322 is rectangular in shape, for example. The incidence end face of the second propagation part 322 forms the remaining part of the incidence end 32a of the waveguide 32. The edge part is defined by the two side surfaces intersecting each other. The edge part is located closer to the rear surface 12b than is the emitting end face of the first propagation part 321. The width of the second propagation part 322 in the Y direction decreases toward the edge part. Each of the top and bottom surfaces of the second propagation part 322 is in the shape of a triangle with its vertex oriented toward the medium facing surface 12a.

For example, the first and second propagation parts 321 and 322 are both rectangular in cross section parallel to the rear surface 12b. The thickness (the dimension in the Z direction) of each of the first and second propagation parts 321 and 322 is constant or almost constant regardless of the distance from the rear surface 12b. The second propagation part 322 is smaller than the first propagation part 321 in length in the X direction.

The width of the first propagation part 321 in the rear surface 12b falls within the range of 1 to 10 μm, for example. The total thickness of the first and second propagation parts 321 and 322 falls within the range of 1 to 10 μm, for example.

The third propagation part 323 has an incidence end face 323a connected to the emitting end face of the first propagation part 321. The incidence end face 323a is rectangular in shape, for example.

Figure 9:
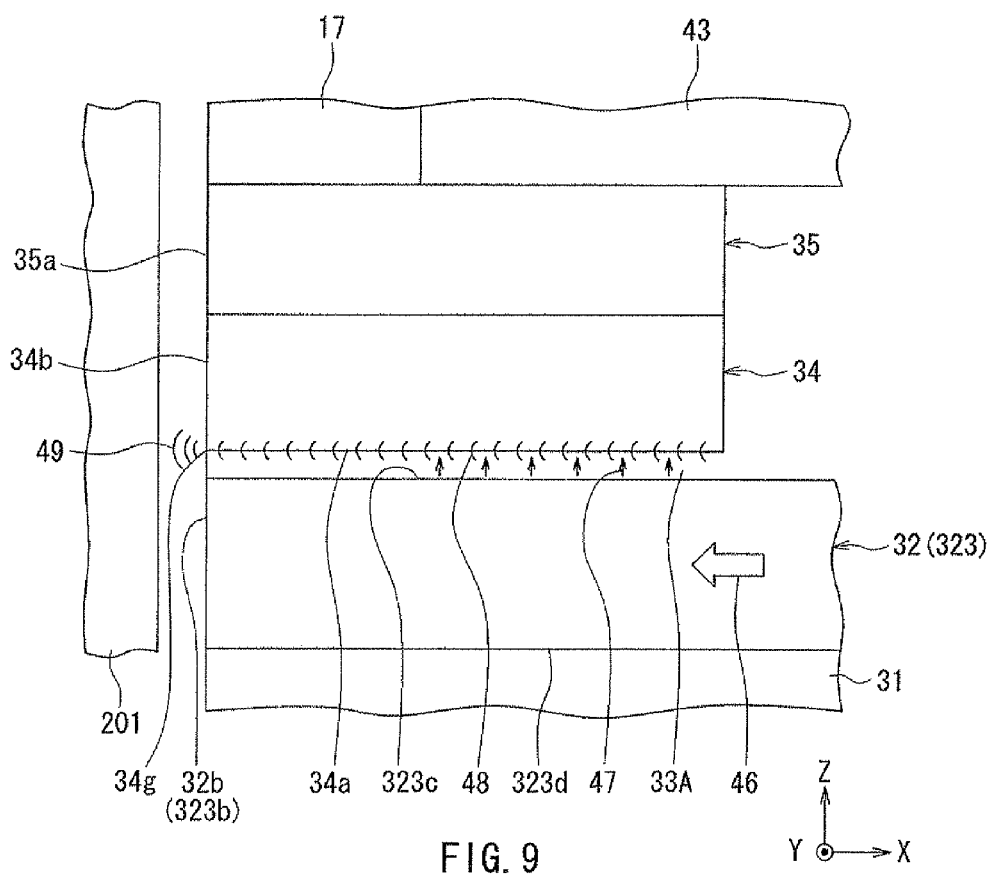
FIG. 9 is a cross-sectional view showing a part of a waveguide, a plasmon generator, and a magnetic pole of the first embodiment of the invention.

Reference is now made to FIG. 9 to describe an example of the shapes and locations of the third propagation part 323 of the waveguide 32, the plasmon generator 34, and the magnetic pole 35. FIG. 9 is a cross-sectional view showing the third propagation part 323, the plasmon generator 34, and the magnetic pole 35.

In the example shown in FIG. 9, the third propagation part 323 has a front end face 323b, an evanescent light generating surface 323c which is a top surface, a bottom surface 323d, and two side surfaces (not shown), as well as the incidence end face 323a shown in FIG. 2. In the present embodiment, the front end face 323b is located in the medium facing surface 12a and forms the emitting end 32b of the waveguide 32. The front end face 323b is rectangular in shape, for example. The evanescent light generating surface 323c generates evanescent light based on the light propagating through the third propagation part 323.

In the example shown in FIG. 9, the plasmon generator 34 has an outer surface that includes a plasmon exciting part 34a and a front end face 34b. The plasmon exciting part 34a is a bottom end of the plasmon generator 34 opposed to the evanescent light generating surface 323c of the third propagation part 323 with a predetermined spacing therebetween. The front end face 34b is located in the medium facing surface 12a. The plasmon exciting part 34a is configured so that surface plasmons are excited thereon through coupling with the evanescent light generated from the evanescent light generating surface 323c. The front end face 34b includes a near-field light generating part 34g. To be specific, the near-field light generating part 34g is an end of the front end face 34b intersecting the plasmon exciting part 34a, or refers to this end and a portion in the neighborhood thereof. The near-field light generating part 34g generates near-field light based on the surface plasmons excited on the plasmon exciting part 34a.

The plasmon generator 34 is in the shape of a triangular prism, for example. In this case, the front end face 34b is in the shape of a triangle with its vertex downward. In this case, the outer surface of the plasmon generator 34 further includes a top surface and two inclined surfaces connected to the front end face 34b, and an edge part opposite to the top surface. The top surface connects the respective top ends of the two inclined surfaces. The two inclined surfaces decrease in distance from each other with increasing distance from the top surface. The edge part is defined by the two inclined surfaces intersecting each other. The plasmon exciting part 34a is formed of the edge part.

A part of the cladding layer 33 that is interposed between the evanescent light generating surface 323c and the plasmon exciting part 34a forms a buffer part 33A, as shown in FIG. 9, which has a refractive index lower than that of the waveguide 32.

In the example shown in FIG. 9, the magnetic pole 35 is disposed at such a location that the plasmon generator 34 is interposed between the magnetic pole 35 and the third propagation part 323. In this example, in particular, the magnetic pole 35 is in contact with the plasmon generator 34. The magnetic pole 35 has an end face 35a located in the medium facing surface 12a. The end face 35a is rectangular in shape, for example.

The shapes and locations of the third propagation part 323, the plasmon generator 34 and the magnetic pole 35 are not limited to the foregoing example described with reference to FIG. 9.

The unit substrate 51, the laser diode 60, the photodetector 80, and the bonding layer 90 will now be described in detail. First, the unit substrate 51 and the laser diode 60 will be described with reference to FIG. 1, FIG. 2 and FIG. 7. As mentioned previously, the outer surface of the unit substrate 51 or the first member includes the top surface 51a, the front end face 51b, the bottom surface 51c, the rear end face 51d, and the two side surfaces 51e and 51f. On the other hand, the outer surface of the laser diode 60 includes the bottom surface 60a, the front end face 60b, the top surface 60c, the rear end face 60d, and the two side surfaces 60e and 60f. The front end face 60b faces the incidence end 32a of the waveguide 32 when in the state in which the unit substrate 51 is bonded to the slider 10.

Reference is now made to FIG. 7 to describe an example of the specific configuration of the laser diode 60. For example, the laser diode 60 is an edge-emitting stripe laser diode. The laser diode 60 has a multi-layer structure in which a p-electrode 61, a p-electrode underlayer 62, a p-cladding layer 63, a first guide layer 64, an active layer 65, a second guide layer 66, an n-cladding layer 67, an n-substrate 68, and an n-electrode 69 are arranged in this order from the bottom surface 60a side. The two cleavage planes of the aforementioned multi-layer structure are coated with reflection layers 71 and 72 of $SiO_2$, $Al_2O_3$ or the like for totally reflecting light to induce oscillation. The bottom surface 60a and the top surface 60c are located at opposite ends in a direction perpendicular to the plane of the active layer 65. The bottom surface 60a is formed of the surface of the p-electrode 61. The top surface 60c is formed of the surface of the n-electrode 69. The front end face 60b is formed of the surface of the reflection layer 71. The rear end face 60d is formed of the surface of the reflection layer 72.

Although not illustrated, the laser diode 60 has a stripe-shaped light propagation path that includes part of the active layer 65 and extends in a direction perpendicular to the front end face 60b and the rear end face 60d. A laser diode having such a stripe-shaped light propagation path is called a stripe laser diode. The first emission part 65a is located at the end of the light propagation path closer to the front end face 60b. The second emission part 65b is located at the end of the light propagation path closer to the rear end face 60d. The emission parts 65a and 65b emit beams of laser light (the forward light 44 and the backward light 45) in directions opposite to each other and parallel to the plane of the active layer 65. Such a laser diode that emits laser light in a direction parallel to the plane of the active layer 65 is called an edge-emitting laser diode. The laser diode 60 preferably allows the first and second emission parts 65a and 65b to emit polarized light of TM-mode whose electric field oscillates in a direction perpendicular to the plane of the active layer 65. The laser diode 60 of the present embodiment can be formed into various configurations without being limited to the configuration shown in FIG. 7.

As shown in FIG. 1, the forward light 44 emitted from the first emission part 65a travels toward the incidence end 32a of the waveguide 32 and is incident on the waveguide 32. The backward light 45 emitted from the second emission part 65b travels in the direction opposite to the direction of the forward light 44. The intensity of the backward light 45 is lower than the intensity of the forward light 44 and proportional to the intensity of the forward light 44. For example, the ratio of the intensity of the backward light 45 to the intensity of the forward light 44 is within the range of 2% to 25%.

The laser diode 60 may be a laser diode of InP type, GaAs type, GaN type or the like that is commonly used for such applications as communications, optical disc storage and material analysis. The laser light (the forward light 44 and the backward light 45) to be emitted by the laser diode 60 may have any wavelength within the range of, for example, 375 nm to 1.7 μm. Specifically, the laser diode 60 may be an InGaAsP/InP quarternary mixed crystal laser diode having an emittable wavelength range of 1.2 to 1.67 μm, for example.

The laser diode 60 further has a first terminal 73 made of a conductive material, disposed on the n-electrode 69 and electrically connected to the n-electrode 69. The first terminal 73 is electrically connected to one of the plurality of pad-shaped terminals of the wiring member 224 shown in FIG. 5.

The light source unit 50 further includes a light source extraction electrode 54 made of a conductive material and disposed on the top surface 51a of the unit substrate 51. The light source extraction electrode 54 includes a first portion 54A, and a second portion 54B contiguous with the first portion 54A. The first portion 54A is located directly below the laser diode 60. The solder layer 53 is interposed between the p-electrode 61 of the laser diode 60 and the first portion 54A. The first portion 54A is electrically connected to the p-electrode 61 via the solder layer 53. As shown in FIG. 3, the second portion 54B extends from the first portion 54A to a side of the laser diode 60 (the right side in FIG. 3). The second portion 54B includes a second terminal 54Ba formed near an end of the second portion 54B farther from the first portion 54A. The second terminal 54Ba is electrically connected to one of the plurality of pad-shaped terminals of the wiring member 224 shown in FIG. 5.

The laser diode 60 is supplied with a predetermined voltage via the first and second terminals 73 and 54Ba. The laser diode 60 can be driven by a power supply inside the magnetic disk drive. The magnetic disk drive usually includes a power supply that generates a voltage of 2 V or so, for example. This supply voltage is sufficient to drive the laser diode 60. The laser diode 60 has a power consumption of, for example, several tens of milliwatts or so, which can be adequately covered by the power supply in the magnetic disk drive.

As shown in FIG. 2, the thickness (the dimension in the Z direction) of the laser diode 60 will be represented by $T_{LA}$ and the length of the laser diode 60 in the X direction will be represented by $H_{LA}$. Further, as shown in FIG. 3, the width of the laser diode 60 in the Y direction will be represented by $W_{LA}$. $T_{LA}$ falls within the range of 60 to 200

μm, for example. $H_{LA}$ is 300 μm, for example. $W_{LA}$ falls within the range of 150 to 250 μm, for example.

Further, as shown in FIG. 2, the thickness (the dimension in the Z direction) of the unit substrate 51 will be represented by $T_{UN}$, and the length of the unit substrate 51 in the X direction will be represented by $H_{UN}$. Further, as shown in FIG. 3, the width of the unit substrate 51 in the Y direction will be represented by $W_{UN}$. $T_{UN}$ is 300 μm, for example. $H_{UN}$ is sufficiently greater than the length $H_{LA}$ of the laser diode 60 in the X direction. $H_{UN}$ is 450 μm, for example. $W_{UN}$ is 500 μm, for example.

The bonding layer 90 will now be described with reference to FIG. 1 to FIG. 3. As mentioned previously, the bonding layer 90 is interposed between the front end face 51b of the unit substrate 51 and the rear surface 10b of the slider 10. The bonding layer 90 includes a bonding material layer 91 made of a bonding material that melts when heated to a predetermined melting temperature or higher. The melting temperature is in the range of 190° C. to 230° C., for example. The bonding material may be Sn solder, for example. The bonding material layer 91 has a thickness in the range of 100 to 5000 nm, for example.

The bonding layer 90 further includes a first metal layer 92 interposed between the front end face 51b and the bonding material layer 91, and a second metal layer 93 interposed between the rear surface 10b and the bonding material layer 91. The second metal layer 93 is larger than the first metal layer 92 in planar shape. In the example shown in FIG. 2, the second metal layer 93 is disposed across the rear surface 11b and the rear surface 12b. The first and second metal layers 92 and 93 are made of Au, for example. The first and second metal layers 92 and 93 each have a thickness in the range of 30 to 3000 nm, for example.

As shown in FIG. 2 and FIG. 3, the bonding layer 90 bonds the unit substrate 51 and the slider 10 together, with the first metal layer 92, the bonding material layer 91 and the second metal layer 93 interposed between the front end face 51b of the unit substrate 51 and the rear surface 10b of the slider 10, the layers 92, 91 and 93 being arranged in this order from the unit substrate 51 side. The light source unit 50 is thereby secured to the slider 10.

The photodetector 80 will now be described with reference to FIG. 1 to FIG. 3. As previously mentioned, the photodetector 80 has the light receiving surface 80a. The light receiving surface 80a is coplanar with the top surface 51a of the unit substrate 51. The light receiving surface 80a is rectangular in shape, for example. The backward light 45 emitted from the second emission part 65b of the laser diode 60 is diverging light, part of which is incident on the light receiving surface 80a. In FIG. 1, the direction of travel of the center of the backward light 45 is indicated by an arrow.

Now, a description will be given of an example of the specific configuration of the photodetector 80. For example, the photodetector 80 is a photodiode having a PIN-diode structure. The photodiode includes, as a plurality of semiconductor layers stacked one on another, a p-type semiconductor layer, an n-type (n+ type) semiconductor layer having a high impurity concentration, and an intrinsic layer disposed between the p-type semiconductor layer and the n-type semiconductor layer and formed of a semiconductor having a very low impurity concentration. The unit substrate 51 in which the photodiode is embedded can be constructed by, for example, forming the n-type semiconductor layer, the intrinsic layer, and the p-type semiconductor layer using well-known semiconductor manufacturing process techniques such as photolithography and ion injection on a semiconductor wafer. Alternatively, the unit substrate 51 can also be fabricated by embedding a chip-shaped photodiode in a recessed portion formed in the unit substrate 51.

Where the photodetector 80 is the photodiode mentioned above, the light source unit 50 further includes a first detector extraction electrode 55, a second detector extraction electrode 56, and a p-electrode 57 each of which is disposed on the top surface 51a of the unit substrate 51. The first detector extraction electrode 55 is disposed to extend from the left side to the upper side of the first portion 54A of the light source extraction electrode 54 in FIG. 3. The second detector extraction electrode 56 is disposed on the right side of the second portion 54B of the light source extraction electrode 54 in FIG. 3. The p-electrode 57 is electrically connected to the p-type semiconductor layer. The first detector extraction electrode 55 is electrically connected to the p-electrode 57. The second detector extraction electrode 56 is electrically connected to the n-type semiconductor layer. The photodiode is supplied with a predetermined voltage via the electrodes 55 and 56. Further, the electrodes 55 and 56 are electrically connected to two of the plurality of pad-shaped terminals of the wiring member 224 shown in FIG. 5. Note that the photodetector 80 of the present embodiment can be formed into various configurations without being limited to the above-described configuration.

Reference is now made to FIG. 1, FIG. 2 and FIG. 9 to describe the principle of generation of near-field light and the principle of thermally-assisted magnetic recording using near-field light. The forward light 44 emitted from the first emission part 65a of the laser diode 60 is incident on the incidence end 32a of the waveguide 32. The forward light 44 or laser light having been incident on the incidence end 32a propagates through the first and second propagation parts 321 and 322. The laser light propagating through the second propagation part 322 gradually moves to the first propagation part 321 as it approaches the edge part of the second propagation part 322. The first and second propagation parts 321 and 322 function as a spot size converter for making the spot size of the emitted light smaller than that of the incident light. More specifically, the laser light propagating through the first and second propagation parts 321 and 322 decreases in beam diameter while propagating through the first and second propagation parts 321 and 322. The first and second propagation parts 321 and 322 may allow the laser light to propagate in a single mode.

The laser light having propagated through the first and second propagation parts 321 and 322 passes through the emitting end face of the first propagation part 321 and the incidence end face 323a of the third propagation part 323. The laser light 46 (see FIG. 9) having passed through the incidence end face 323a of the third propagation part 323 propagates through the third propagation part 323 and reaches the vicinity of the plasmon generator 34. The plasmon generator 34 is configured to excite surface plasmons on the plasmon generator 34 based on the light propagating through the third propagation part 323 and to generate near-field light from the medium facing surface 12a based on the surface plasmons. More specifically, in the third propagation part 323, the laser light 46 is totally reflected at the evanescent light generating surface 323c to cause the evanescent light generating surface 323c to generate evanescent light 47 permeating into the buffer part 33A. Then, surface plasmons 48 are excited on the plasmon exciting part 34a of the plasmon generator 34 through coupling with the evanescent light 47. The surface plasmons 48 propagate along the plasmon exciting part 34a to the near-field light generating part 34g located in the medium facing surface 12a. As a result, the surface plasmons 48 concentrate at the near-field light generating part 34g, and the near-field light generating part 34g generates near-field light 49 based on the surface plasmons 48.

The near-field light 49 is projected toward the magnetic disk 201, reaches the surface of the magnetic disk 201 and heats a part of the magnetic recording layer of the magnetic disk 201. This lowers the coercivity of the part of the magnetic recording layer. In thermally-assisted magnetic recording, the part of the magnetic recording layer with the lowered coercivity is subjected to a write magnetic field produced by the magnetic pole 35 for data writing.

A method of manufacturing the slider 10 of the present embodiment will now be described briefly. The method of manufacturing the slider 10 includes the steps of: forming components of a plurality of sliders 10 other than the slider substrates 11 on a substrate that includes portions to become the slider substrates 11 of the plurality of sliders 10, thereby fabricating a substructure including a plurality of rows of pre-slider portions that are to become the sliders 10 later; and forming the sliders 10 by cutting the substructure to separate the pre-slider portions from each other. In the step of forming the sliders 10, the cut surfaces are polished into the medium facing surfaces 11a and 12a.

A method of manufacturing the light source unit 50 of the present embodiment will now be described. The method of manufacturing the light source unit 50 includes the step of fabricating the unit substrate 51 with the photodetector 80 embedded therein, and the step of bonding the laser diode 60 and the unit substrate 51 together. In the step of bonding the laser diode 60 and the unit substrate 51 together, the laser diode 60 is bonded to the unit substrate 51 in the following manner, for example. First, the solder layer 53 is formed on the bottom surface 60a of the laser diode 60. Further, the light source extraction electrode 54, the first detector extraction electrode 55, the second detector extraction electrode 56, and the p-electrode 57 are formed on the top surface 51a of the unit substrate 51. Next, the solder layer 53 and the light source extraction electrode 54 are brought into contact with each other to cause the solder layer 53 and the light source extraction electrode 54 to be interposed between the laser diode 60 and the unit substrate 51. Then, the unit substrate 51 in this state is heated to melt the solder layer 53. The melted solder layer 53 is then solidified to bond the laser diode 60 to the unit substrate 51.

Figure 10:
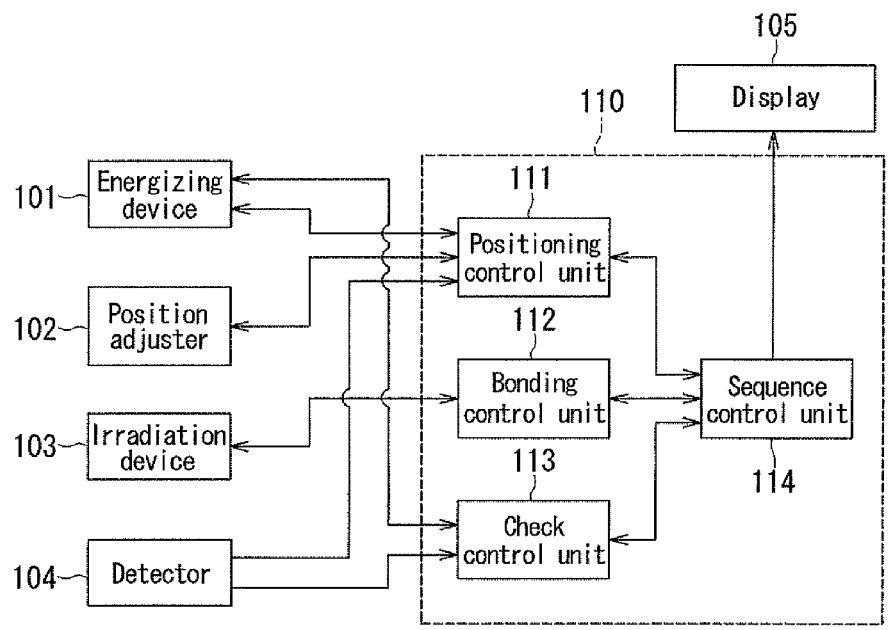
FIG. 10 is a block diagram showing the configuration of an apparatus for manufacturing the electronic device according to the first embodiment of the invention.
Figure 11:
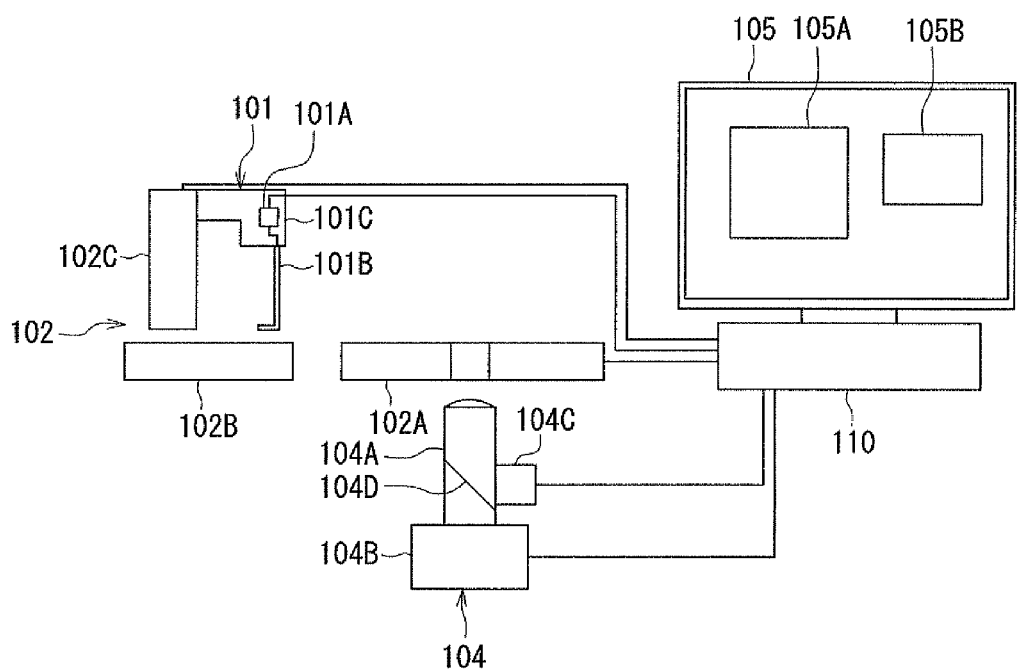
FIG. 11 is an explanatory diagram schematically illustrating the apparatus for manufacturing the electronic device according to the first embodiment of the invention.

Now, a manufacturing method for the thermally-assisted magnetic recording head or the electronic device according to the present embodiment will be described. First, reference is made to FIG. 10 and FIG. 11 to describe the configuration of a manufacturing apparatus according to the present embodiment suitable for the manufacturing method for the electronic device according to the present embodiment. FIG. 10 is a block diagram showing the configuration of the manufacturing apparatus. FIG. 11 is an explanatory diagram schematically showing the manufacturing apparatus. The manufacturing apparatus for the electronic device includes an energizing device 101, a position adjuster 102, an irradiation device 103, a detector 104, and a controller 110.

The energizing device 101 is for energizing the laser diode 60 to allow the laser diode 60 to emit laser light. The energizing device 101 has a power supply 101A for driving the laser diode 60, two probes 101B made of a conductor and electrically connected to the power supply 101A, and a movable unit 101C for supporting the two probes 101B. The power supply 101A is provided inside the movable unit 101C, for example. The movable unit 101C is movable in one direction (a horizontal direction in FIG. 11). When manufacturing the electronic device, one of the two probes 101B comes in contact with the first terminal 73 (see FIG. 2) and the other comes in contact with the second terminal 54Ba (see FIG. 3).

The position adjuster 102 is for adjusting the position of the unit substrate 51 or the first member with respect to the slider 10 or the second member. The position adjuster 102 has a stage 102A on which the slider 10 is to be placed, a stage 102B on which the unit substrate 51 before being bonded to the slider 10 is to be placed, and a suction nozzle 102C for attracting the unit substrate 51 by suction. When placed on the stage 102B, the unit substrate 51 is in the state in which the laser diode 60 is bonded thereto, that is, in the form of the light source unit 50. The movable unit 101C and the two probes 101B of the energizing device 101 and the suction nozzle 102C are integrated in one unit.

The position adjuster 102 further has a driving unit (not illustrated) capable of moving the suction nozzle 102C in directions perpendicular and parallel to the top surfaces of the stages 102A and 102B. When manufacturing the electronic device, the position adjuster 102 allows the non-illustrated driving unit to move the suction nozzle 102C with the unit substrate 51 adhering thereto by suction, and thereby adjusts the position of the unit substrate 51 with respect to the slider 10. The position adjuster 102 may further have another driving unit (not illustrated) for moving the stage 102A in a direction parallel to the top surface thereof.

The irradiation device 103 is for irradiating the unit substrate 51 or the first member with heating light. The heating light is for melting the bonding material of which the bonding material layer 91 is made. Note that FIG. 11 omits the illustration of the irradiation device 103. The configuration of the irradiation device 103 will be described in detail later.

The detector 104 is for detecting a parameter value corresponding to the intensity of light having been incident on the incidence end 32a and propagated through the waveguide 32. In the present embodiment, the detector 104 particularly detects the intensity of light having propagated through the waveguide 32 and emitted from the emitting end 32b of the waveguide 32 as the parameter value. The detector 104 has a lens system 104A for light to be incident on, an image sensor 104B for capturing the light incident on the lens system 104A, a photodiode 104C for detecting the intensity of the light incident on the lens system 104A, and a splitter filter 104D for splitting the light incident on the lens system 104A into light traveling to the image sensor 104B and light traveling to the photodiode 104C. For example, a charge coupled device (CCD) is employed as the image sensor 104B.

The controller 110 receives the value detected by the detector 104 and controls the energizing device 101, the position adjuster 102, and the irradiation device 103. The controller 110 has a positioning control unit 111 for controlling the energizing device 101 and the position adjuster 102, a bonding control unit 112 for controlling the irradiation device 103, a check control unit 113 for controlling the energizing device 101, and a sequence control unit 114. The detector 104 is connected to the positioning control unit 111 and the check control unit 113. The sequence control unit 114 controls the positioning control unit 111, the bonding control unit 112 and the check control unit 113 to thereby perform control on a series of operations of the manufacturing apparatus during manufacture of the electronic device.

The controller 110 is implemented by a personal computer, for example. In this case, the positioning control unit 111, the bonding control unit 112, the check control unit 113, and the sequence control unit 114 are not physically separate components but can be implemented by software. The manufacturing apparatus for the electronic device further includes a display 105 and an input device (not illustrated) which are connected to the controller 110. The display 105 displays various types of information related to the manufacture of the electronic device. In the example shown in FIG. 11, a display window of the display 105 includes a region 105A on which an image captured by the image sensor 104B of the detector 104 is displayed, and a region 105B on which the intensity of the light detected by the photodiode 104C of the detector 104 is displayed. The sequence control unit 114 is connected to the display 105. The non-illustrated input device is used to receive various types of parameters for manufacturing the electronic device or provide instructions for various types of operations of the manufacturing apparatus.

Now, a description will be given of the manufacturing method for the electronic device according to the present embodiment which uses the manufacturing apparatus described above. The manufacturing method for the electronic device according to the present embodiment is performed with the laser diode 60 bonded to the unit substrate 51. The manufacturing method includes: a positioning step of positioning the unit substrate 51 or the first member with respect to the slider 10 or the second member with a preliminary bonding layer interposed between the unit substrate 51 and the slider 10 before being bonded together so that the laser light emitted from the laser diode 60 will be incident on the incidence end 32a of the waveguide 32, the preliminary bonding layer including the bonding material and being configured to later become the bonding layer 90; a bonding step of bonding the unit substrate 51 and the slider 10 together after the positioning step; and a checking step of checking the accuracy of positioning of the unit substrate 51 with respect to the slider 10 after the bonding step.

In the positioning step, the laser diode 60 is energized to allow the laser diode 60 to emit laser light, the laser light is allowed to be incident on the incidence end 32a of the waveguide 32, a parameter value corresponding to the intensity of light having been incident on the incidence end 32a and propagated through the waveguide 32 is detected, and the position of the unit substrate 51 with respect to the slider 10 is determined based on the value detected. In the bonding step, the unit substrate 51 is irradiated with the heating light without energizing the laser diode 60, the bonding material included in the preliminary bonding layer is thereby heated and melted with the heating light, and thereafter the irradiation of the unit substrate 51 with the heating light is stopped to allow the bonding material to solidify so that the preliminary bonding layer becomes the bonding layer 90. In the checking step, the laser diode 60 is energized again to allow the laser diode 60 to emit laser light, the laser light is allowed to be incident on the incidence end 32a of the waveguide 32, a parameter value corresponding to the intensity of light having been incident on the incidence end 32a and propagated through the waveguide 32 is detected, and the accuracy of positioning of the unit substrate 51 with respect to the slider 10 is checked based on the value detected.

The manufacturing method for the electronic device according to the present embodiment further includes a first cooling step of allowing the laser diode 60 to decrease in temperature by not energizing the laser diode 60 for a first period of time, the first cooling step being performed between the positioning step and the bonding step, and a second cooling step of allowing the laser diode 60 to decrease in temperature by not energizing the laser diode 60 for a second period of time, the second cooling step being performed between the bonding step and the checking step.

In order for the above-described manufacturing method to be accomplished, the controller 110 controls the energizing device 101 and the irradiation device 103 so that the unit substrate 51 is not irradiated with the heating light when the laser diode 60 is energized, whereas the laser diode 60 is not energized when the unit substrate 51 is irradiated with the heating light.

In the present embodiment, the controller 110 particularly performs a positioning operation, a bonding operation, and a checking operation as described below. In the positioning operation, the energizing device 101 and the position adjuster 102 are controlled to energize the laser diode 60 with the preliminary bonding layer interposed between the unit substrate 51 and the slider 10 before being bonded together, and to determine the position of the unit substrate 51 with respect to the slider 10 based on the value detected by the detector 104, whereby the unit substrate 51 is positioned with respect to the slider 10 so that the laser light emitted from the laser diode 60 will be incident on the incidence end 32a of the waveguide 32. In the positioning operation, subsequently, the energizing device 101 is controlled to de-energize the laser diode 60. In the bonding operation, the irradiation device 103 is controlled to irradiate the unit substrate 51 with the heating light after the positioning operation to thereby heat and melt the bonding material included in the preliminary bonding layer with the heating light, and then the irradiation of the unit substrate 15 with the heating light is stopped to allow the bonding material to solidify so that the preliminary bonding layer becomes the bonding layer 90, whereby the unit substrate 51 and the slider 10 are bonded together. In the checking operation, the laser diode 60 is energized again after the bonding step, and the accuracy of positioning of the unit substrate 51 with respect to the slider 10 is checked based on the value detected by the detector 104.

Further, the controller 110 sets, for the first cooling step described above, a first interval between the positioning operation and the bonding operation during which the laser diode 60 is not energized for the first period of time, and for the second cooling step described above, a second interval between the bonding operation and the checking operation during which the laser diode 60 is not energized for the second period of time.

Figure 12:
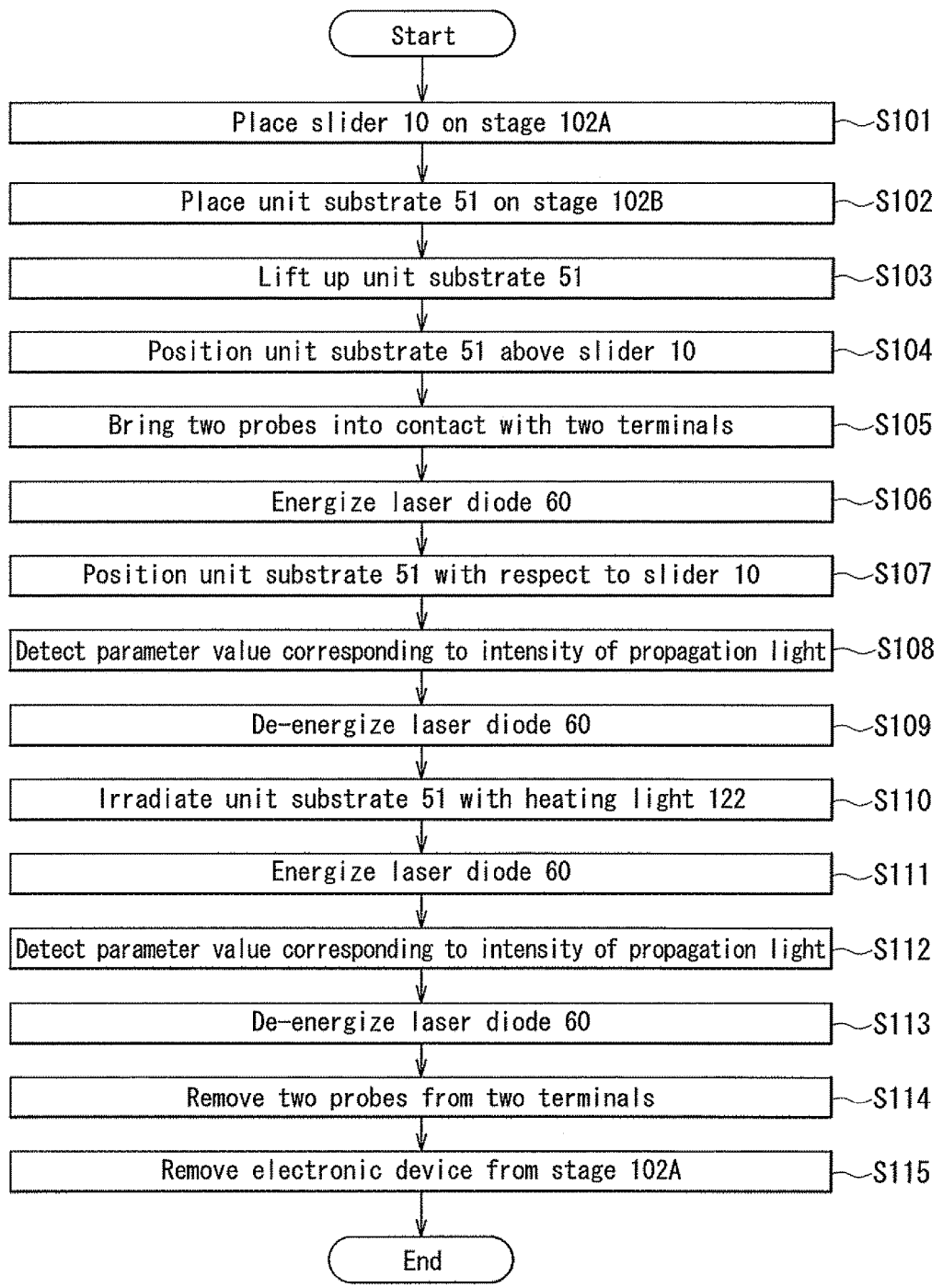
FIG. 12 is a flow chart showing a method of manufacturing the electronic device according to the first embodiment of the invention.
Figure 13:
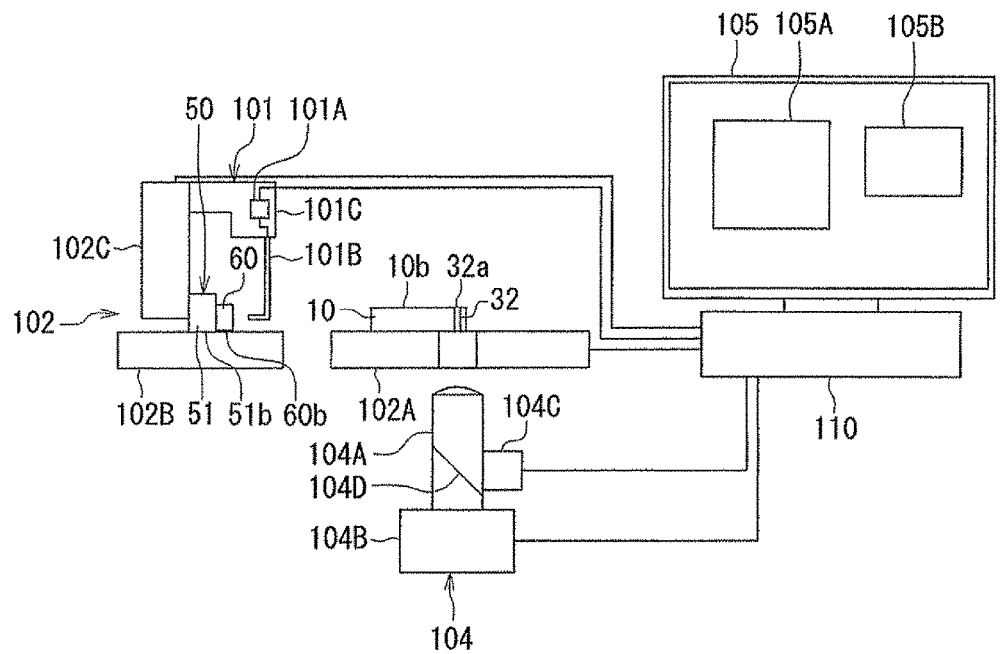
FIG. 13 is an explanatory diagram showing a step of the method of manufacturing the electronic device according to the first embodiment of the invention.
Figure 14:
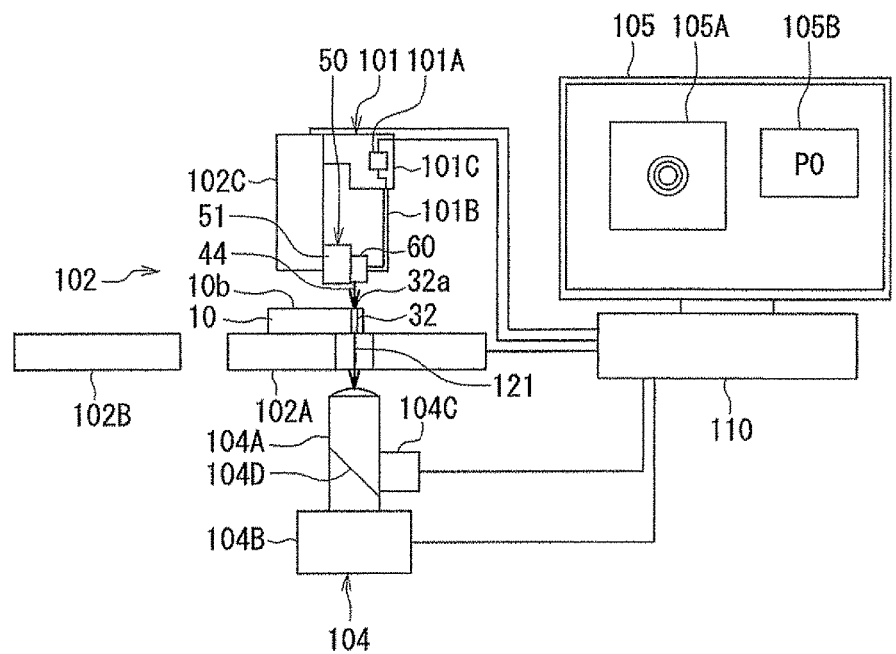
FIG. 14 is an explanatory diagram showing a step that follows the step shown in FIG. 13.
Figure 15:
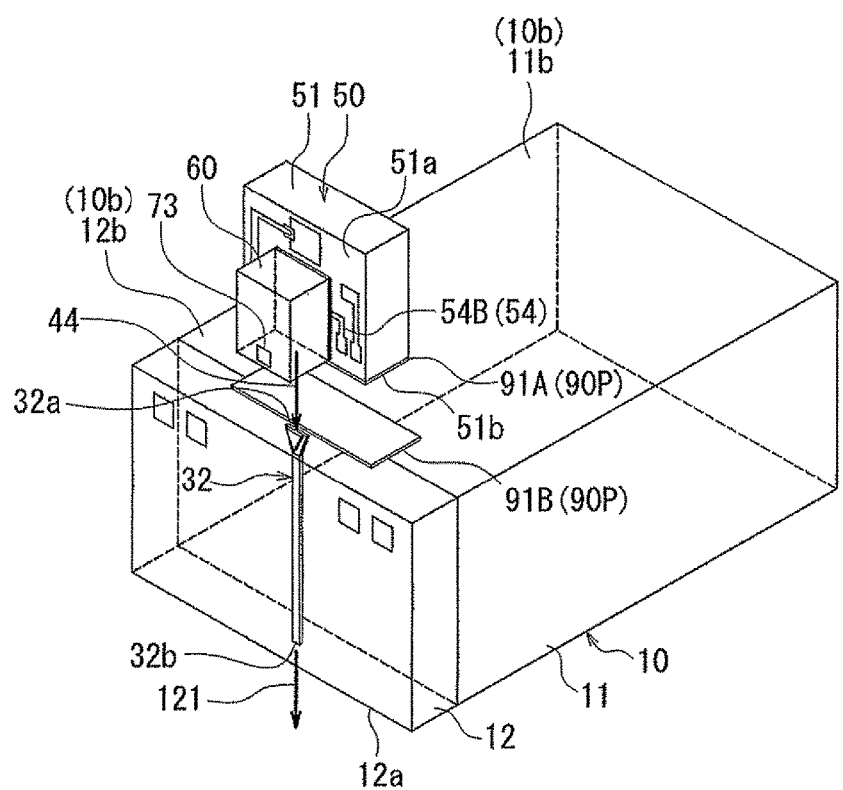
FIG. 15 is a perspective view showing the step of FIG. 14.
Figure 16:
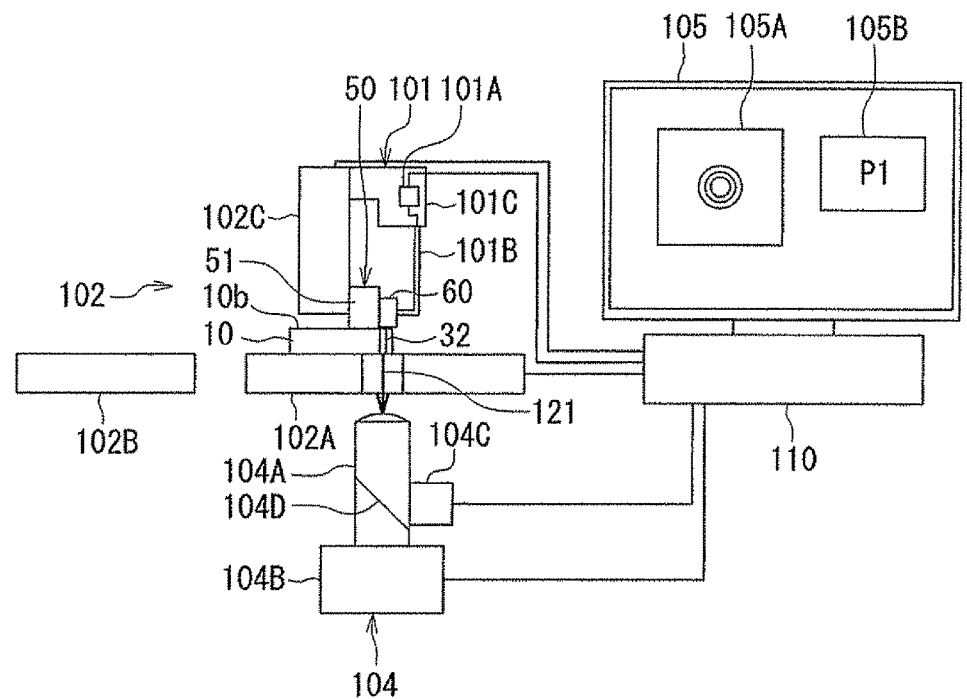
FIG. 16 is an explanatory diagram showing a step that follows the step shown in FIG. 14.
Figure 17:
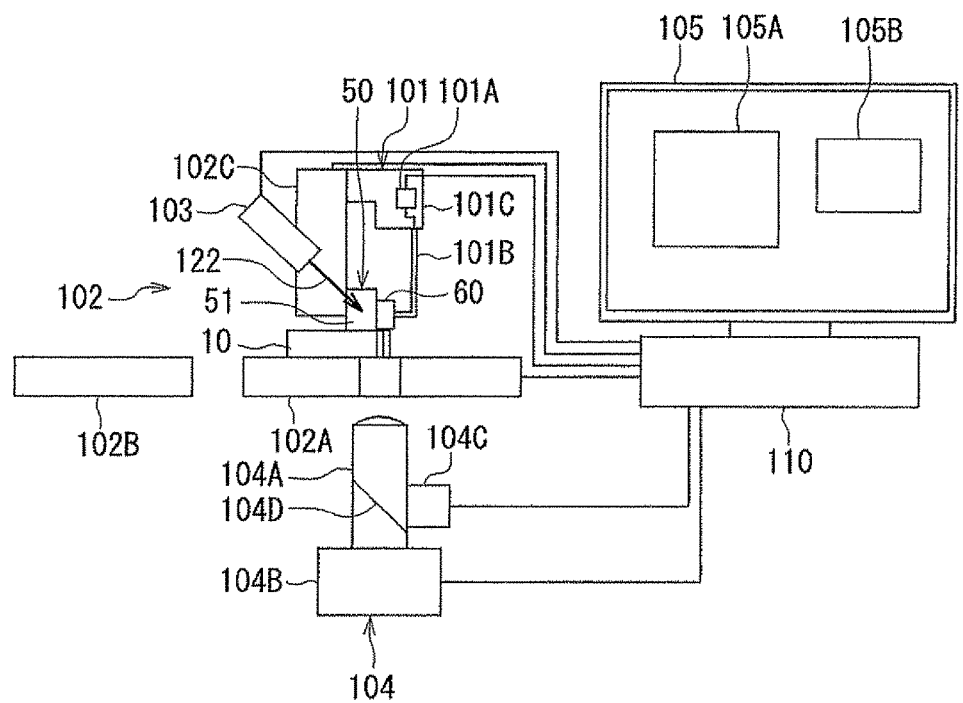
FIG. 17 is an explanatory diagram showing a step that follows the step shown in FIG. 16.
Figure 18:
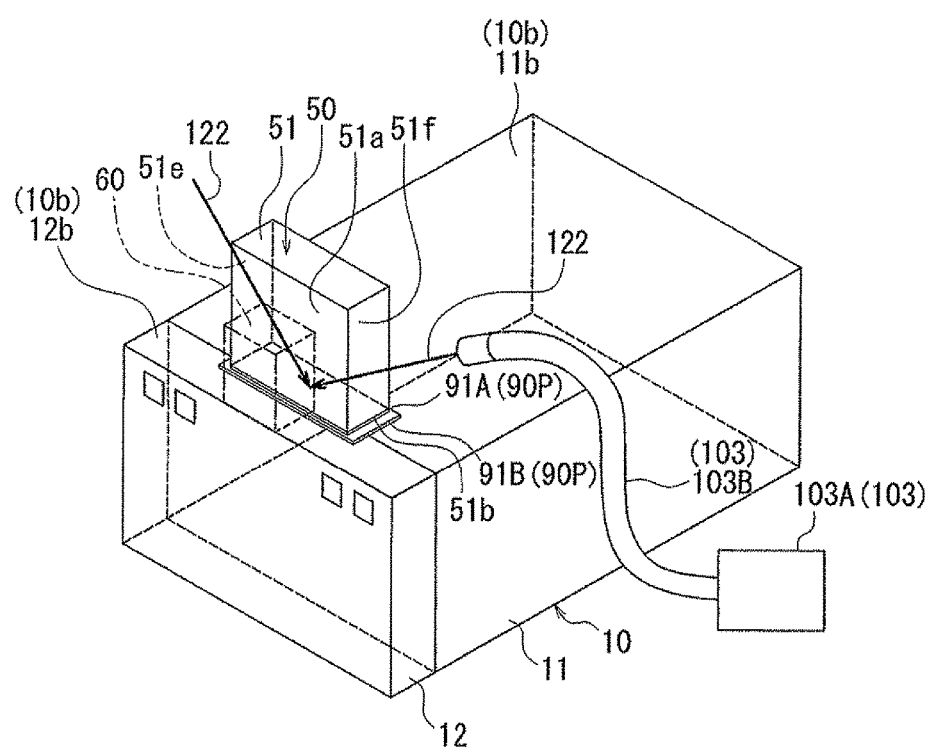
FIG. 18 is a perspective view showing the step of FIG. 17.

Reference is now made to FIG. 12 to FIG. 19 to describe in detail the manufacturing method for the electronic device according to the present embodiment. FIG. 12 is a flow chart showing the manufacturing method for the electronic device according to the present embodiment. FIGS. 13, 14, 16, 17, and 19 each show the state of the manufacturing apparatus in the course of manufacture of the electronic device. To facilitate understanding, in FIGS. 13, 14, 16, 17 and 19, the light source unit 50 and the waveguide 32 are depicted as being larger than they actually are relative to the slider 10. FIGS. 15 and 18 each show the state of the electronic device in the process of being manufactured.

In the manufacturing method for the electronic device according to the present embodiment, the step of forming the preliminary bonding layer is performed before the positioning step. In this step, the first metal layer 92 (see FIG. 2 and FIG. 3) and a first layer 91A which constitutes part of the bonding material layer 91 are formed in this order on the front end face 51b of the unit substrate 51. Further, the second metal layer 93 (see FIG. 2 and FIG. 3) and a second layer 91B which constitutes the remaining part of the bonding material layer 91 are formed in this order on the rear surface 10b of the slider 10. Note that the first layer 91A and the second layer 91B are shown in FIG. 15 and FIG. 18 to be described later. Both the first layer 91A and the second layer 91B are made of the bonding material mentioned previously. The first metal layer 92, the first layer 91A, the second layer 91B, and the second metal layer 93 constitute the preliminary bonding layer configured to later become the bonding layer 90. The preliminary bonding layer includes the bonding material, that is, the first layer 91A and the second layer 91B. The first layer 91A may have the same planar shape as that of the first metal layer 92. The second layer 91B may have the same planar shape as that of the second metal layer 93.

FIG. 13 illustrates steps S101 and S102 shown in FIG. 12, which are executed after the preliminary bonding layer is formed. In step S101, the slider 10 is placed at a predetermined position on the stage 102A. The slider 10 is placed such that its rear surface 10b faces toward the same direction as does the top surface of the stage 102A, that is, upward in FIG. 13. Next, in step S102, the unit substrate 51 with the laser diode 60 bonded thereto is placed at a predetermined position on the stage 102B. The unit substrate 51 is placed such that the front end face 51b of the unit substrate 51 and the front end face 60b of the laser diode 60 face the top surface of the stage 102B.

FIG. 14 and FIG. 15 illustrate steps S103 to S107 shown in FIG. 12. In step S103 to be executed after step S102, the position adjuster 102 is controlled so that the suction nozzle 102C attracts the unit substrate 51 by suction and lifts it up. Then, in step S104, the position adjuster 102 is controlled to position the unit substrate 51 above the slider 10 so that the front end face 51b of the unit substrate 51 faces the rear surface 10b of the slider 10 with a predetermined spacing therebetween. This brings the state in which the preliminary bonding layer is interposed between the unit substrate 51 and the slider 10 before being bonded together. In FIG. 15, symbol 90P denotes the preliminary bonding layer. Note that FIG. 15 omits the illustration of the first and second metal layers 92 and 93.

In steps S103 and S104, the suction nozzle 102O with the unit substrate 51 adhering thereto by suction is moved by the non-illustrated driving unit of the position adjuster 102, whereby the unit substrate 51 is allowed to move. To move the unit substrate 51 in the steps to be performed later, the same manner as in steps S103 and S104 will be followed.

Then, in step S105, the energizing device 101 is controlled to move the movable unit 101C so as to bring the two probes 101B of the energizing device 101 into contact with the two terminals 73 and 54Ba. This allows the laser diode 60 and the power supply 101A to be electrically connected to each other. Then, in step S106, the energizing device 101 is controlled to energize the laser diode 60 to allow the laser diode 60 to emit laser light, i.e., the forward light 44.

Then, in step S107, the position adjuster 102 is controlled to position the unit substrate 51 with respect to the slider 10. More specifically, step S107 is performed in the following manner, for example. First, the unit substrate 51 is moved in a direction parallel to the rear surface 10b of the slider 10, and the position of the unit substrate 51 with respect to the slider 10 is adjusted so that the forward light 44 will be incident on the incidence end 32a of the waveguide 32. Whether the forward light 44 has been incident on the waveguide 32 or not is determined by using the image sensor 104B of the detector 104, for example. More specifically, light having been incident on the incidence end 32a and propagated through the waveguide 32 is emitted from the emitting end 32b of the waveguide 32. The lens system 104A of the detector 104 is disposed to face the emitting end 32b of the waveguide 32. Thus, the light 121 emitted from the emitting end 32b is incident on the lens system 104A and then captured by the image sensor 104B. Monitoring the image captured by the image sensor 104B makes it possible to know that the forward light 44 has been incident on the incidence end 32a of the waveguide 32.

Next, the unit substrate 51 is moved in a direction parallel to the rear surface 10b of the slider 10 in a more precise manner, and the position of the unit substrate 51 with respect to the slider 10 is adjusted so that the intensity P0 of the light 121 detected by the photodiode 104C of the detector 104 becomes maximum. The intensity P0 is a parameter value corresponding to the intensity of light having been incident on the incidence end 32a and propagated through the waveguide 32. Then, the unit substrate 51 is moved in a direction perpendicular to the rear surface 10b so as to bring the first layer 91A and the second layer 91B into contact with each other. The position of the unit substrate 51 with respect to the slider 10 is thereby determined.

In the present embodiment, as described above, in steps S106 and S107 the laser diode 60 is energized to allow the laser diode 60 to emit laser light, i.e., the forward light 44, the forward light 44 is allowed to be incident on the incidence end 32a of the waveguide 32, the parameter value corresponding to the intensity of light having been incident on the incidence end 32a and propagated through the waveguide 32, i.e., the intensity P0 of the light 121 is detected, and the position of the unit substrate 51 with respect to the slider 10 is determined based on the intensity P0 detected. Steps S106 and S107 correspond to the positioning step and the positioning operation of the present invention.

FIG. 16 illustrates steps S108 and S109 shown in FIG. 12. In step S108 to be executed after step S107, with the position of the unit substrate 51 with respect to the slider 10 having been determined, the intensity P1 of the light 121, which is a parameter value corresponding to the intensity of light having been incident on the incidence end 32a and propagated through the waveguide 32, is detected. Note that in FIG. 12, the light having been incident on the incidence end 32a and propagated through the waveguide 32 is referred to as "propagation light." Next, in step S109, the energizing device 101 is controlled to de-energize the laser diode 60.

In the present embodiment, between step S109 and step S110 to be described subsequently, there are provided the first cooling step and the first interval to allow the laser diode 60 to decrease in temperature by not energizing the laser diode 60 for a first period of time. Preferably, the first period of time is sufficiently longer than a period of time to elapse until the temperature of the laser diode 60 is decreased to reach a constant level after the laser diode 60 is de-energized. For example, where a period of about ten milliseconds is to elapse until the aforementioned constant level is reached, the first period of time is preferably about 100 milliseconds.

FIG. 17 and FIG. 18 illustrate step S110 shown in FIG. 12. In step S110 to be executed after the first cooling step, first, the irradiation device 103 is controlled to irradiate the unit substrate 51 with the heating light 122, so that the bonding material included in the preliminary bonding layer 90P is heated and melted with the heating light 122. The irradiation device 103 includes a bonding laser 103A serving as a laser light source for producing the heating light 122, and an optical fiber 103B through which the heating light 122 propagates from the bonding laser 103A to the vicinity of the unit substrate 51. The heating light 122 is, for example, Nd-YAG laser light having a wavelength of 1064 nm.

As shown in FIG. 18, the heating light 122 is projected to travel through the unit substrate 51 from the side surfaces 51e and 51f to the front end face 51b of the unit substrate 51, for example. The heating light 122 having entered the unit substrate 51 propagates through the unit substrate 51 and is projected onto the surface of the first metal layer 92 (see FIG. 2 and FIG. 3) in contact with the front end face 51b. The heating light 122 projected onto the surface of the first metal layer 92 heats the bonding material included in the preliminary bonding layer 90P, that is, the first layer 91A and the second layer 91B. Being heated to the melting temperature or higher by the heating light 122, the bonding material melts.

Next, the irradiation device 103 is controlled to stop the irradiation of the unit substrate 51 with the heating light 122, whereby the bonding material is solidified. This causes the first layer 91A and the second layer 91B to be integrated into the bonding material layer 91, thereby making the preliminary bonding layer 90P into the bonding layer 90. The unit substrate 51 and the slider 10 are thereby bonded together to allow the light source unit 50 to be secured to the slider 10. Step S110 corresponds to the bonding step and the bonding operation of the present invention.

In the present embodiment, between step S110 and step S111 to be described subsequently, there are provided the second cooling step and the second interval to allow the laser diode 60 to decrease in temperature by not energizing the laser diode 60 for a second period of time. The second period of time is about 100 milliseconds, for example.

Figure 19:
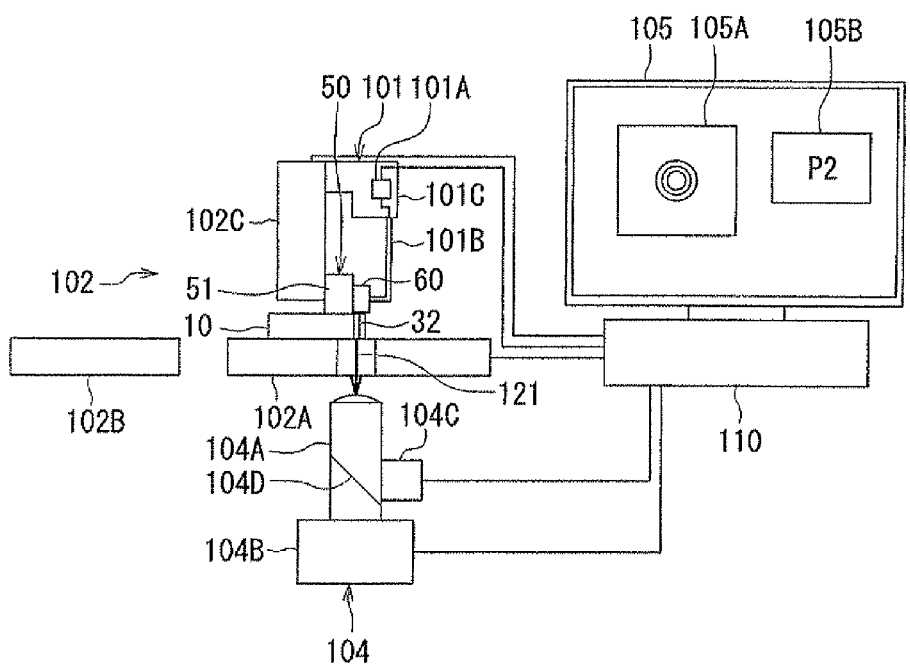
FIG. 19 is an explanatory diagram showing a step that follows the step shown in FIG. 17.

FIG. 19 shows steps S111 and S112. In step S111 to be executed after the second cooling step, the energizing device 101 is controlled to energize the laser diode 60 again to allow the laser diode 60 to emit laser light, and the laser light is allowed to be incident on the incidence end 32a of the waveguide 32. Next, in step S112, a parameter value corresponding to the intensity of light (propagation light) having been incident on the incidence end 32a and propagated through the waveguide 32, i.e., the intensity P2 of the light 121, is detected. Then, the accuracy of positioning of the unit substrate 51 with respect to the slider 10 is checked based on the intensity P2 of the light 121 detected.

More specifically, the accuracy of positioning of the unit substrate 51 with respect to the slider 10 is checked by using, for example, an indicator ΔP which represents in percentage the ratio P2/P1 of the intensity P2 of the light 121 detected in step S112 to the intensity P1 of the light 121 detected in step S108. It can be said that the closer the indicator ΔP is to 100%, the higher the accuracy of positioning is. Steps S111 and S112 correspond to the checking step and the checking operation of the present invention.

Next, in step S113, the energizing device 101 is controlled to de-energize the laser diode 60. Then, in step S114, the energizing device 101 is controlled to move the movable unit 101C to remove the two probes 101B of the energizing device 101 from the two terminals 73 and 54Ba. Then, in step S115, the slider 10 with the light source unit 50 secured thereto, that is, the electronic device, is removed from the stage 102A. The electronic device is completed through the series of steps described above.

The effects of the method and apparatus for manufacturing the electronic device according to the present embodiment will now be described. In the present embodiment, the unit substrate 51 is not irradiated with the heating light 122 when the laser diode 60 is energized, whereas the laser diode 60 is not energized when the unit substrate 51 is irradiated with the heating light 122. This makes it possible to prevent the laser diode 60 from suffering deterioration or failure. This effect will be described in more detail below in comparison with a manufacturing method for an electronic device of a comparative example.

First, the manufacturing method for the electronic device of the comparative example will be described. The manufacturing method for the electronic device of the comparative example lacks steps S109 and S111 shown in FIG. 12. Thus, in the manufacturing method for the electronic device of the comparative example, while the laser diode 60 is energized, that is, while the laser diode 60 is emitting the forward light 44, the unit substrate 51 is irradiated with the heating light 122 to thereby heat and melt the bonding material included in the preliminary bonding layer 90P with the heating light 122. After that, the irradiation of the unit substrate 51 with the heating light 122 is stopped to solidify the bonding material so that the preliminary bonding layer 90P becomes the bonding layer 90. The other steps in the manufacturing method for the electronic device of the comparative example are the same as those in the manufacturing method for the electronic device according to the present embodiment.

Figure 20:
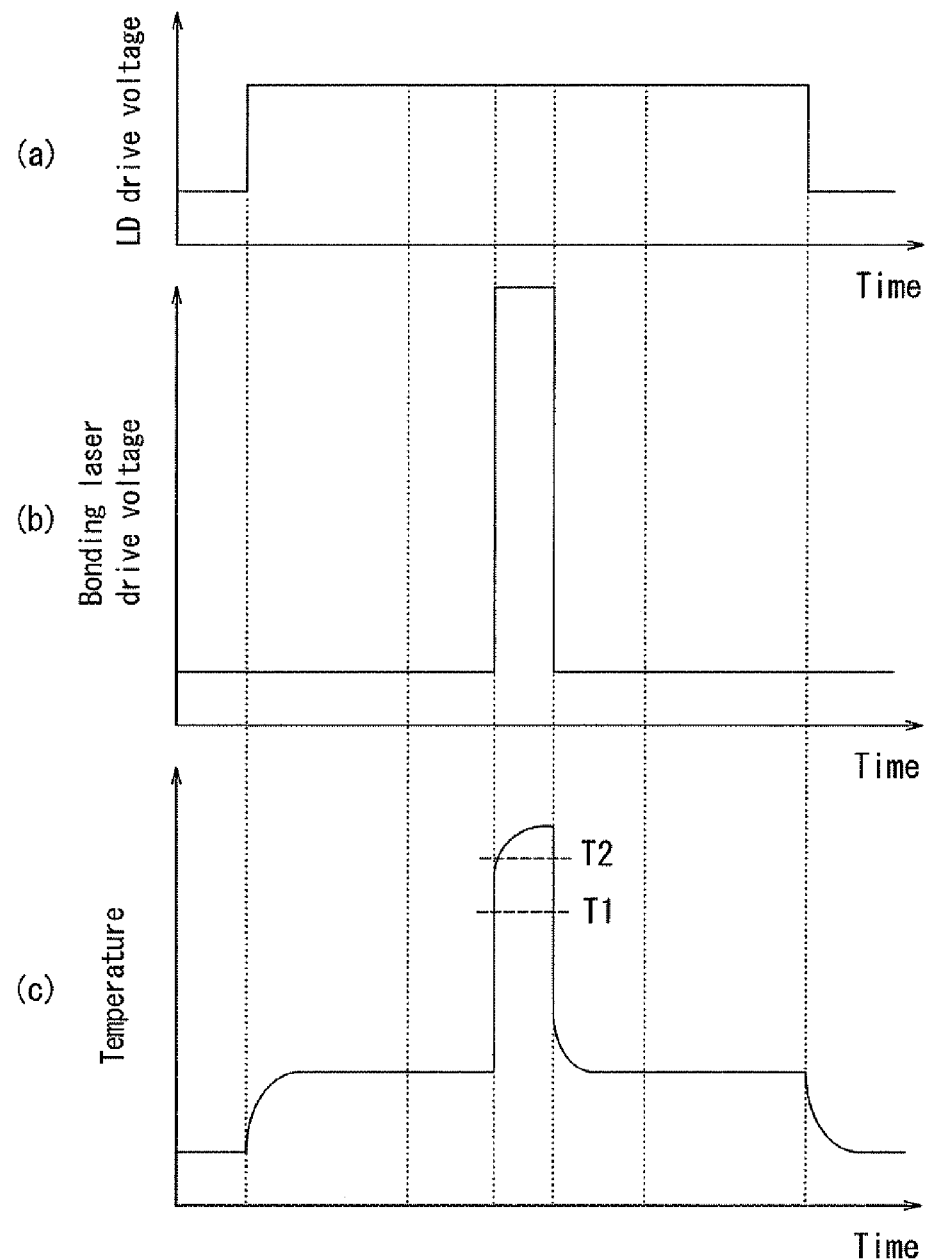
FIG. 20 is an explanatory diagram schematically illustrating the operations of a laser diode and an irradiation device and the temperature of the laser diode in a method of manufacturing an electronic device of a comparative example.

FIG. 20 is an explanatory diagram schematically illustrating the operations of the laser diode 60 and the irradiation device 103 and the temperature of the laser diode 60 in the manufacturing method for the electronic device of the comparative example. In FIG. 20, portion (a) is a graph showing the operation of the laser diode 60. In portion (a), the horizontal axis represents time, and the vertical axis represents the drive voltage for the laser diode 60 (shown as LD drive voltage in the figure). In the graph shown in portion (a), the low level indicates the non-energized state of the laser diode 60, and the high level indicates the energized state of the laser diode 60.

In FIG. 20, portion (b) is a graph showing the operation of the irradiation device 103. In portion (b), the horizontal axis represents time, and the vertical axis represents the drive voltage for the bonding laser 103A (shown as bonding laser drive voltage in the figure). In the graph shown in portion (b), the low level indicates the condition in which the unit substrate 51 is not irradiated with the heating light 122, whereas the high level indicates the condition in which the unit substrate 51 is irradiated with the heating light 122.

In FIG. 20, portion (c) is a graph showing changes in the temperature of the laser diode 60. In portion (c), the horizontal axis represents time, and the vertical axis represents the temperature of the laser diode 60. The graph shown in portion (c) was obtained by simulation. Further, in portion (c), T1 represents the melting temperature of the bonding material included in the preliminary bonding layer 90P, and T2 represents the minimum temperature of the laser diode 60 at which a deterioration or failure of the laser diode 60 may occur. As shown in FIG. 20, the temperature T2 is higher than the melting temperature T1.

As shown in FIG. 20, in the manufacturing method for the electronic device of the comparative example, energizing the laser diode 60 causes the temperature of the laser diode 60 to increase to a certain level and subsequently become constant. Then, when the unit substrate 51 is irradiated with the heating light 122 through the use of the irradiation device 103, the temperature of the laser diode 60 adjacent to the unit substrate 51 significantly increases to become higher than the melting temperature T1 and the temperature T2. Then, upon stopping the irradiation with the heating light 122, the temperature of the laser diode 60 decreases to a certain level and subsequently becomes constant. Then, upon de-energization of the laser diode 60, the temperature of the laser diode 60 further decreases. As described above, in the manufacturing method for the electronic device of the comparative example, the temperature of the laser diode 60 becomes higher than the temperature T2 during the irradiation with the heating light 122 through the use of the irradiation device 103. This raises a problem with this method that there may occur defective products due to deterioration or failure of the laser diode 60.

Figure 21:
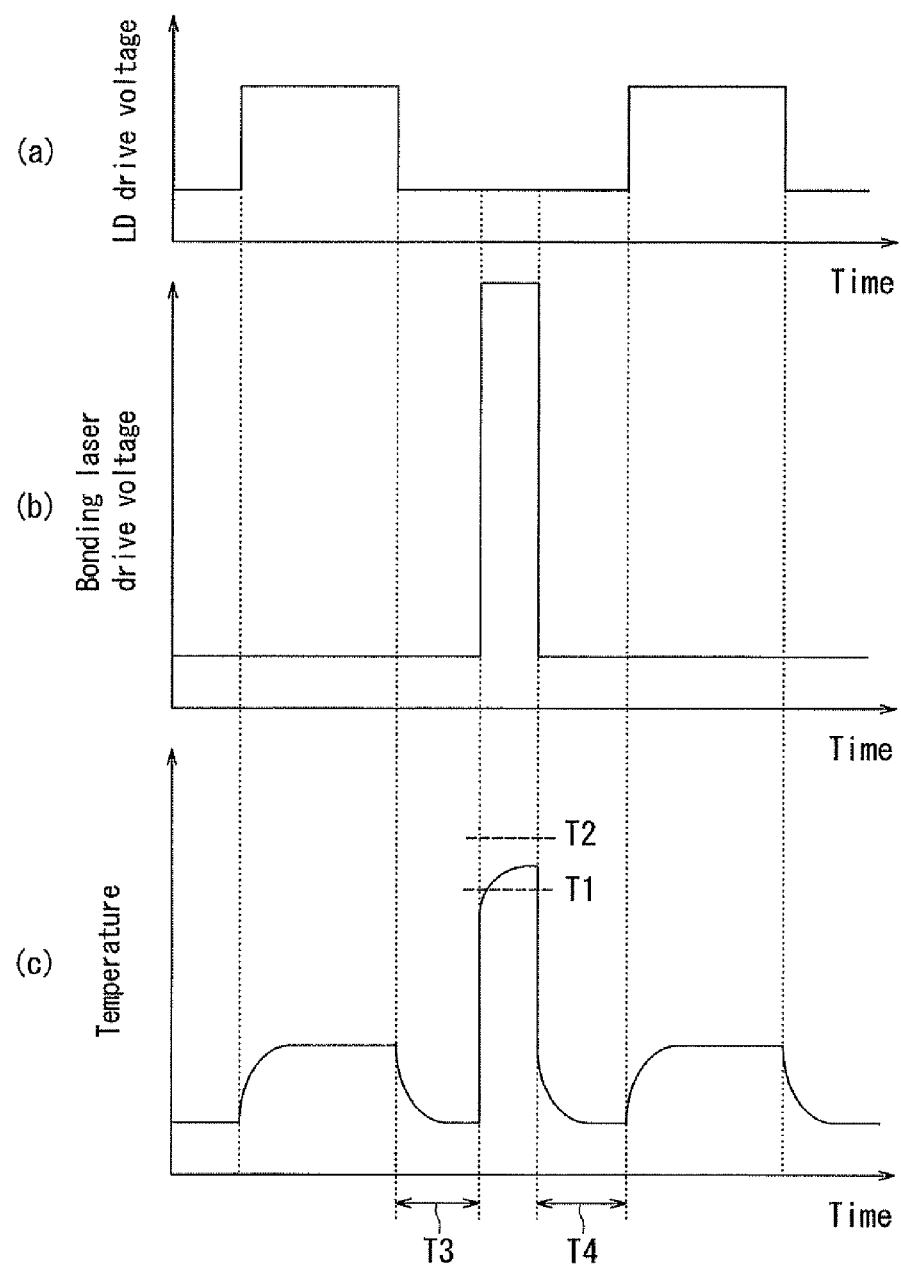
FIG. 21 is an explanatory diagram schematically illustrating the operations of a laser diode and an irradiation device and the temperature of the laser diode in the method of manufacturing the electronic device according to the first embodiment of the invention.

In contrast to this, according to the present embodiment, it is possible to prevent the temperature of the laser diode 60 from becoming higher than the temperature T2. FIG. 21 is an explanatory diagram schematically illustrating the operations of the laser diode 60 and the irradiation device 103 and the temperature of the laser diode 60 in the manufacturing method for the electronic device according to the present embodiment. In FIG. 21, portion (a) is a graph showing the operation of the laser diode 60, portion (b) is a graph showing the operation of the irradiation device 103, and portion (c) is a graph showing changes in the temperature of the laser diode 60. The horizontal axis and the vertical axis in portions (a), (b), and (c) of FIG. 21 are the same as those in portions (a), (b), and (c) of FIG. 20. In portion (c) of FIG. 21, symbol T3 represents the first interval, and symbol T4 represents the second interval.

In the present embodiment, the laser diode 60 is de-energized before the irradiation with the heating light 122 through the use of the irradiation device 103. Thus, the temperature of the laser diode 60 starts to decrease upon de-energization of the laser diode 60, and becomes lower than in the comparative example immediately before the unit substrate 51 is irradiated with the heating light 122. In particular, the present embodiment provides the first cooling step (the first interval) in which the laser diode 60 is not energized for the first period of time to thereby allow the laser diode 60 to decrease in temperature. This makes it possible to decrease the temperature of the laser diode 60 more effectively. As a result, in the present embodiment, the temperature of the laser diode 60 when the unit substrate 51 is irradiated with the heating light 122 is lower than the temperature T2. Consequently, according to the present embodiment, it is possible to prevent the laser diode 60 from suffering deterioration or failure.

Figure 22:
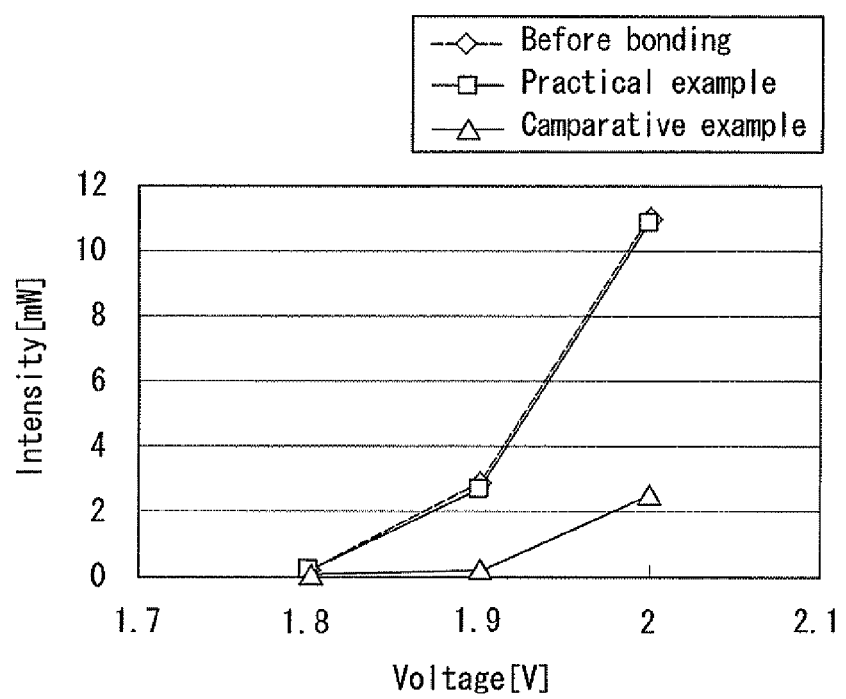
FIG. 22 is a characteristic diagram illustrating the output characteristic of a laser diode of an electronic device of a practical example and the output characteristic of the laser diode of the electronic device of the comparative example.

Now, experimental results showing the effects of the present embodiment will be described with reference to FIG. 22. FIG. 22 is a characteristic diagram showing the output characteristic of the laser diode 60 of an electronic device of a practical example manufactured by the manufacturing method for the electronic device according to the present embodiment and the output characteristic of the laser diode 60 of an electronic device of a comparative example manufactured by the manufacturing method for the electronic device of the comparative example. In FIG. 22, the horizontal axis represents the magnitude of a voltage applied to the laser diode 60, and the vertical axis represents the intensity of laser light emitted from the laser diode 60. FIG. 22 also shows, with a broken line, the output characteristic of the laser diode 60 before the unit substrate 51 and the slider 10 are bonded together (hereinafter, this output characteristic will be referred to as the initial characteristic). It can be seen from FIG. 22 that the laser diode 60 of the electronic device of the comparative example shows a reduction in intensity of the laser light and a deterioration in the output characteristic when compared with the initial characteristic. The deterioration in the output characteristic is thought to be caused mainly by the occurrence of electromigration in the laser diode 60 because of the temperature increase of the laser diode 60 in the energized state.

In contrast to this, the output characteristic of the laser diode 60 of the electronic device of the practical example is almost the same as the initial characteristic. This shows that the present embodiment makes it possible to prevent the laser diode 60 from suffering deterioration that may lead to degradation in the output of the laser diode 60.

As can be seen from the foregoing, the present embodiment makes it possible to manufacture the electronic device without causing deterioration or failure of the laser diode 60.

In step S110 shown in FIG. 12, there may occur misalignment of the unit substrate 51 with respect to the slider 10 in the process of melting and then solidifying the bonding material included in the preliminary bonding layer 90P to thereby secure the unit substrate 51 to the slider 10. If the accuracy of positioning of the unit substrate 51 with respect to the slider 10 were not checked after bonding the slider 10 and the unit substrate 51 together, it would be impossible to find a misalignment of the unit substrate 51 with respect to the slider 10 and there would be a possibility of occurrence of defective products.

To prevent this, in the present embodiment, steps S111 and S112 subsequent to step S110 are performed so that the laser diode 60 is energized again to allow the forward light 44 to be emitted from the laser diode 60 and then incident on the incidence end 32a of the waveguide 32, and the intensity P2 of the light 121, which is a parameter value corresponding to the intensity of light (propagation light) having been incident on the incidence end 32a and propagated through the waveguide 32, is detected. Then, the accuracy of positioning of the unit substrate 51 with respect to the slider 10 is checked based on the intensity P2 of the light 121 detected. According to the present embodiment, this makes it possible to identify electronic devices that are high in accuracy of positioning of the unit substrate 51 with respect to the slider 10, and to supply such electronic devices as products. Consequently, according to the present embodiment, it is possible to prevent the occurrence of defective products in which there is misalignment of the unit substrate 51 with respect to the slider 10. For example, the indicator ΔP mentioned previously is employed as a reference for identifying electronic devices of high positioning accuracy. By way of example, electronic devices having an indicator ΔP of 90% or higher may be identified and supplied as products.

Second Embodiment

Figure 23:
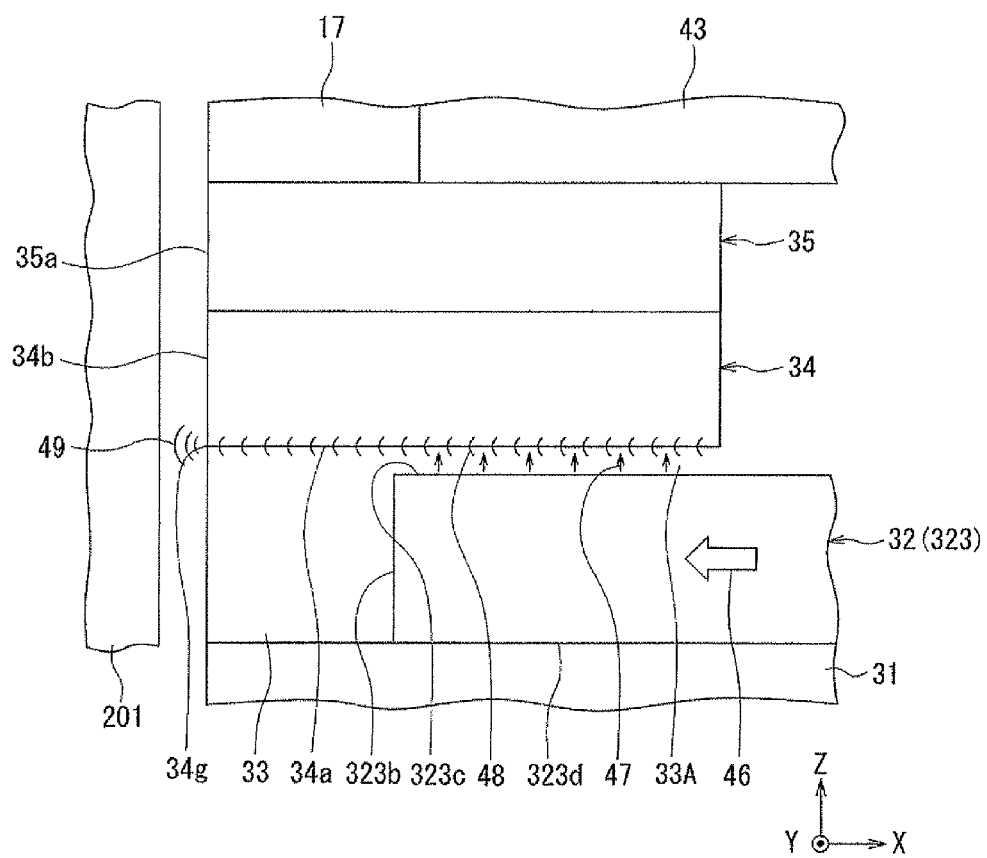
FIG. 23 is a cross-sectional view showing a part of a waveguide, a plasmon generator, and a magnetic pole of a second embodiment of the invention.

A second embodiment of the present invention will now be described. First, the configuration of the thermally-assisted magnetic recording head of the present embodiment will be described with reference to FIG. 23. FIG. 23 is a cross-sectional view showing the waveguide 32 (the third propagation part 323), the plasmon generator 34, and the magnetic pole 35 of the present embodiment. In the present embodiment, the waveguide 32 has a front end face facing toward the medium facing surface 12a, in place of the emitting end 32b. The front end face is formed of the front end face 323b of the third propagation part 323 of the waveguide 32. The front end face of the waveguide 32 (the front end face 323b of the third propagation part 323) is located at a distance from the medium facing surface 12a. The remainder of configuration of the thermally-assisted magnetic recording head of the present embodiment is the same as that of the head of the first embodiment.

Figure 24:
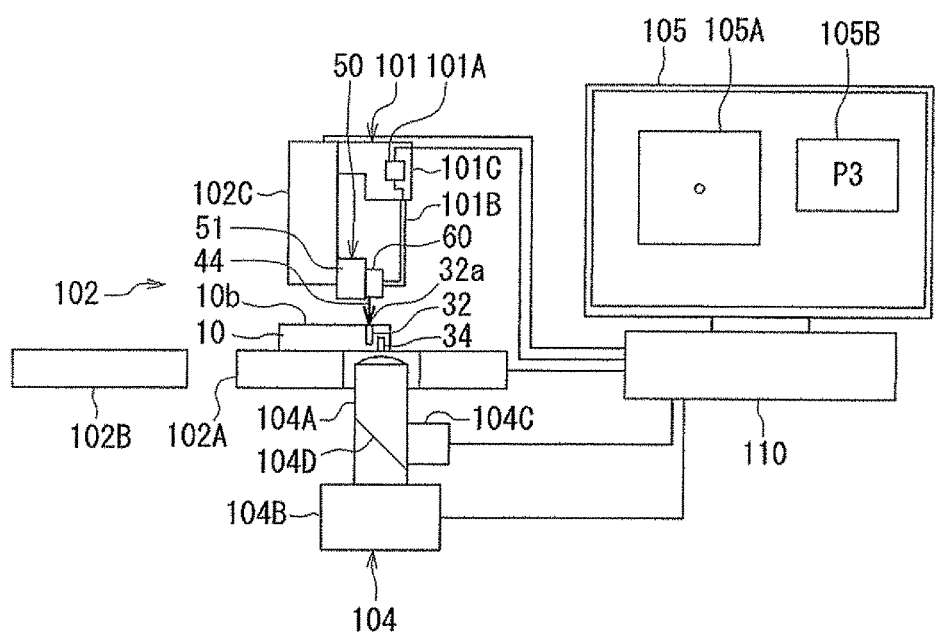
FIG. 24 is an explanatory diagram showing a step of a method of manufacturing an electronic device according to the second embodiment of the invention.
Figure 25:
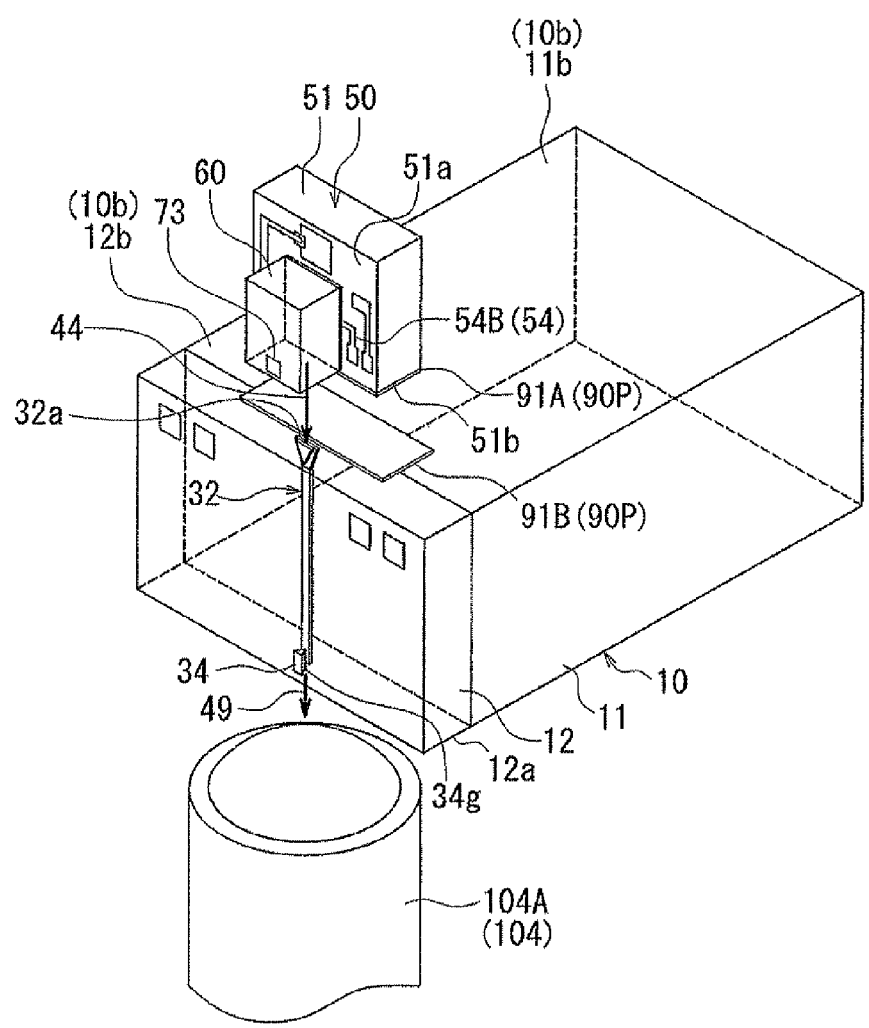
FIG. 25 is a perspective view showing the step of FIG. 24.

Reference is now made to FIG. 24 and FIG. 25 to describe the differences of the method and apparatus for manufacturing the electronic device according to the present embodiment from the method and apparatus according to the first embodiment. FIG. 24 shows the state of the manufacturing apparatus in the course of manufacture of the electronic device. To facilitate understanding, in FIG. 24 the light source unit 50, the waveguide 32 and the plasmon generator 34 are depicted as being larger than they actually are relative to the slider 10. FIG. 25 shows the state of the electronic device in the process of being manufactured.

In the present embodiment, the detector 104 detects the intensity of the near-field light 49 generated by the plasmon generator 34, as the parameter corresponding to the intensity of light having been incident on the incidence end 32a and propagated through the waveguide 32. The lens system 104A of the detector 104 is disposed to face the near-field light generating part 34g of the plasmon generator 34. The image sensor 104B of the detector 104 captures the near-field light 49 incident on the lens system 104A. The photodiode 104C of the detector 104 detects the intensity of the near-field light 49 incident on the lens system 104A. Note that the lens system 104A is located closer to the medium facing surface 12a than in the first embodiment so as to allow the near-field light 49 to be incident thereon.

In the present embodiment, steps S107, S108 and S112 of the first embodiment shown in FIG. 12 are changed as follows. In step S107, the forward light 44 emitted from the laser diode 60 is allowed to be incident on the incidence end 32a of the waveguide 32, the intensity P3 of the near-field light 49 is detected, and the position of the unit substrate 51 with respect to the slider 10 is determined based on the intensity P3 detected. In step S108, the intensity of the near-field light 49 is detected with the position of the unit substrate 51 with respect to the slider 10 having been determined. In step S112, the intensity of the near-field light 49 is detected and the accuracy of positioning of the unit substrate 51 with respect to the slider 10 is checked based on the detected intensity of the near-field light 49.

The remainder of configuration, function and effects of the present embodiment are similar to those of the first embodiment.

The present invention is not limited to the foregoing embodiments, and various modifications may be made thereto. For example, the preliminary bonding layer 90P may be composed of one of the first layer 91A and the second layer 91B. Further, the electronic device of the present invention is not limited to a thermally-assisted magnetic recording head, and may also be an optical pickup of an optical information read/write apparatus, or an optical communication device.

It is apparent that the present invention can be carried out in various forms and modifications in the light of the foregoing descriptions. Accordingly, within the scope of the following claims and equivalents thereof, the present invention can be carried out in forms other than the foregoing most preferred embodiments.

What is claimed is:

1. A method of manufacturing an electronic device, the electronic device including:
   a laser diode that emits laser light when energized;
   a first member supporting the laser diode;
   a second member to which the first member is bonded, the second member having a waveguide allowing the laser light to propagate through; and
   a bonding layer bonding the first member and the second member together, wherein
   the bonding layer includes a bonding material layer made of a bonding material that melts when heated to a predetermined melting temperature or higher, and
   the waveguide has an incidence end on which the laser light emitted from the laser diode is to be incident,
   the method comprising:
   a positioning step of positioning the first member with respect to the second member with a preliminary bonding layer interposed between the first member and the second member before being bonded together so that the laser light emitted from the laser diode will be incident on the incidence end of the waveguide, the preliminary bonding layer including the bonding material and being configured to later become the bonding layer;
   a bonding step of bonding the first member and the second member together after the positioning step; and
   a checking step of checking the accuracy of positioning of the first member with respect to the second member after the bonding step, wherein
   in the positioning step, the laser diode is energized to allow the laser diode to emit laser light, the laser light is allowed to be incident on the incidence end of the waveguide, a parameter value corresponding to the intensity of light having been incident on the incidence end and propagated through the waveguide is detected, and a position of the first member with respect to the second member is determined based on the value detected,
   in the bonding step, the first member is irradiated with heating light without energizing the laser diode, the bonding material included in the preliminary bonding layer is thereby heated and melted with the heating light, and thereafter the irradiation of the first member with the heating light is stopped to allow the bonding material to solidify so that the preliminary bonding layer becomes the bonding layer, and
   in the checking step, the laser diode is energized again to allow the laser diode to emit laser light, the laser light is allowed to be incident on the incidence end of the waveguide, a parameter value corresponding to the intensity of light having been incident on the incidence end and propagated through the waveguide is detected, and the accuracy of positioning of the first member with respect to the second member is checked based on the value detected.

2. The method of manufacturing the electronic device according to claim 1, further comprising a first cooling step of allowing the laser diode to decrease in temperature by not energizing the laser diode for a first period of time, the first cooling step being performed between the positioning step and the bonding step, and a second cooling step of allowing the laser diode to decrease in temperature by not energizing the laser diode for a second period of time, the second cooling step being performed between the bonding step and the checking step.

3. The method of manufacturing the electronic device according to claim 1, wherein
   the waveguide further has an emitting end from which light having been incident on the incidence end and propagated through the waveguide is emitted, and
   in the positioning step and the checking step, the intensity of the light emitted from the emitting end is detected as the parameter value.

4. The method of manufacturing the electronic device according to claim 1, wherein the second member is a slider for thermally-assisted magnetic recording, the slider having:

a medium-facing surface for facing a magnetic recording medium;

a magnetic pole having an end face located in the medium-facing surface, the magnetic pole for producing a write magnetic field for writing data on the magnetic recording medium;

the waveguide; and a plasmon generator configured to excite a surface plasmon based on light having been incident on the incidence end and propagated through the waveguide and to generate near-field light from the medium-facing surface based on the surface plasmon.

5. The method of manufacturing the electronic device according to claim 4, wherein the waveguide further has an emitting end from which light having been incident on the incidence end and propagated through the waveguide is emitted, and in the positioning step and the checking step, the intensity of the light emitted from the emitting end is detected as the parameter value.

6. The method of manufacturing the electronic device according to claim 4, wherein, in the positioning step and the checking step, the intensity of the near-field light generated by the plasmon generator is detected as the parameter value.

* * * * *